(12) United States Patent
Lawler et al.

(10) Patent No.: US 11,570,377 B2
(45) Date of Patent: Jan. 31, 2023

(54) CAMERA ARRAY

(71) Applicant: Drivingplates.com LLC, Yelm, WA (US)

(72) Inventors: Michael Shawn Lawler, Yelm, WA (US); Ian Sharples, Epsom (GB)

(*) Notice: Subject to any disclaimer, the term of this patent is extended or adjusted under 35 U.S.C. 154(b) by 0 days.

(21) Appl. No.: 17/835,903

(22) Filed: Jun. 8, 2022

(65) Prior Publication Data
US 2022/0303477 A1 Sep. 22, 2022

Related U.S. Application Data

(63) Continuation-in-part of application No. 17/373,721, filed on Jul. 12, 2021, now Pat. No. 11,388,352.

(60) Provisional application No. 63/050,365, filed on Jul. 10, 2020.

(51) Int. Cl.
*H04N 5/247* (2006.01)
*H04N 7/18* (2006.01)
*H04N 5/225* (2006.01)

(52) U.S. Cl.
CPC .......... *H04N 5/247* (2013.01); *H04N 5/2253* (2013.01); *H04N 7/18* (2013.01)

(58) Field of Classification Search
None
See application file for complete search history.

(56) References Cited

U.S. PATENT DOCUMENTS 8,811,812 B1* 8/2014 Lawler .................... B60R 11/04
396/419
10,880,474 B1* 12/2020 Thomas .................. B60R 11/04

* cited by examiner

*Primary Examiner* — James M Anderson, II

(57) ABSTRACT

A plurality of outward-facing cameras, arranged in nodal clusters surrounding and mounted to the top plate of a plate structure, with the plate structure having an elevated platform for an additional upward-facing camera. The nodal clusters and the configuration of clusters on the top plate enable overlaps in coverage between clusters and more informationally dense coverage within each cluster.

17 Claims, 42 Drawing Sheets

CAMERA ARRAY

PRIORITY CLAIM

This application claims the benefit of and priority to U.S. Provisional Application Ser. No. 63/050,365, filed Jul. 10, 2020, and U.S. Non-Provisional application Ser. No. 17/373,721, filed Jul. 12, 2021. The above referenced applications are incorporated in their entirety as if restated in full.

BACKGROUND

Currently there are a number of solutions for providing a camera array that captures multiple directions simultaneously. Some of these solutions arrange the cameras in a "rosette formation" and some utilize a camera overlap formation. The "rosette formation" is by far the most utilized, but it fails to meet the standards of the industry because there is considerably less overlap and increased parallax. With all cameras facing out and away from each other, those formations will inherently result in less favorable results.

Parallax is an optical displacement of an apparent position that occurs when an object is seen from more than one position. Each position reveals a distinct "face" or angle of the object as well as different contextual facts, i.e., the object's position vis-à-vis other objects. The different views are utilized in stereopsis, a mental process in which an observer judges object distance, but the difference creates a parallax error in photography. A parallax error may occur with respect to a single camera shot if the lens viewer differs in position from the capture lens, although here the error is merely that the view seen through the viewer is not the view that is actually captured via the lens. This kind of parallax error is relatively trivial, and can be overcome by merging the viewer with the lens.

A more significant kind of parallax error occurs if an object or view is captured via multiple shots, since the shots cannot simply be stitched together to produce a single natural image. In particular, the views will not align since any particular object in each of the shots will be seen from a different perspective and therefore reveal a face that is not duplicated across the shots. Even if the faces are stitched together at their seams to create a single object, that single object may look unnatural, depending on the displacement of positions. But more importantly, that object will not have the same position with respect to other objects in the shots, and it may be impossible to stitch together multiple objects due to occlusion configurations. Occlusion configurations occur as the line of a sight of a particular view converges with the line on which the objects are both positioned, with complete occlusion occurring when the line of sight is the same as the positional line.

At the same time, it is desirably to exploit this kind of parallax error in the sense that the multiple faces captured provide additional information in that the objects may be seen more completely.

Compounding the parallax error described above is the natural warping effect of a camera lens. Multiple shots, made by cameras directed at adjacent areas, will produce a reoccurring warping pattern—specifically, a radial Moire pattern. If the shots are stitched together, a pattern of central (i.e., magnified) to peripheral warping will repeat across the panorama.

Another kind of parallax error occurs if there is insufficient overlap between the camera views. Objects that are positioned at an angle between the views of each camera may be entirely absent from the shots. This problem is more likely to occur the closer the objects are to the cameras and the further the cameras are from one another. Because of the material depth of the devices themselves, multiple cameras cannot originate at a common "origin", even if the angle of their views intersect at such an origin. Therefore, although such object omissions may be mitigated by placing the cameras closer together, there is a limit to this solution imposed by the material depth of the devices themselves.

In cinematography, filming using a moving camera inherently introduces a plurality of views, but this does not produce a parallax error because the plurality of views are displayed over time rather than simultaneously. No stitching is necessary, and therefore no alignment problems arise. However, if multiple cameras are used, then the parallax errors discussed above occur and for the same reasons.

Some solutions to parallax error utilize a camera overlap formation, including a traditional two image overlap and a three image overlap. The two image formation uses a timing algorithm in order to reduce errors. However, mere timing algorithms only assist in obtaining shots that are likely to overlay in a less problematic fashion.

What is needed is a camera device and configuration, specifically a placement and orientation of cameras, that reduces these parallax errors and which does not rely heavily on algorithmic assistance and/or manual correction.

SUMMARY

It is desirable to have a system that can capture multiple directions simultaneously while reducing optical errors which result in parallax. Furthermore, it is desirable to have a system that arranges all of the cameras close to each other on a common plate. Still, further, it is desirable to have multiple nodal formations nested together on the common plate. The disclosed system advantageously fills these needs and addresses the aforementioned deficiencies by providing camera configurations that result in images at substantially overlapping angles in every direction.

Disclosed is a camera array system comprising a plurality of outward-facing camera clusters mounted on a plate structure and surrounding an upward-facing camera. The disclosed system is unique when compared with other known systems and solutions in that it provides camera configurations that result in images at substantially overlapping angles in every direction. The nodal formations of outward-facing camera clusters are arranged every 90 degrees around a center of the plate and provide superior coverage and less distortion compared to similar systems. A key feature of the nodal formations is the intersecting of the angles of view, which provide not only more complete coverage of the objects which are closest to a given nodal formation, but also ensure an overlap of coverage, specifically a panoramic overlap, with the footage captured by adjacent nodal formations. The system can provide image data, quality and stability that is necessary for utilization in modern visual effects and software environments.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Camera Array may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

Figure 1:
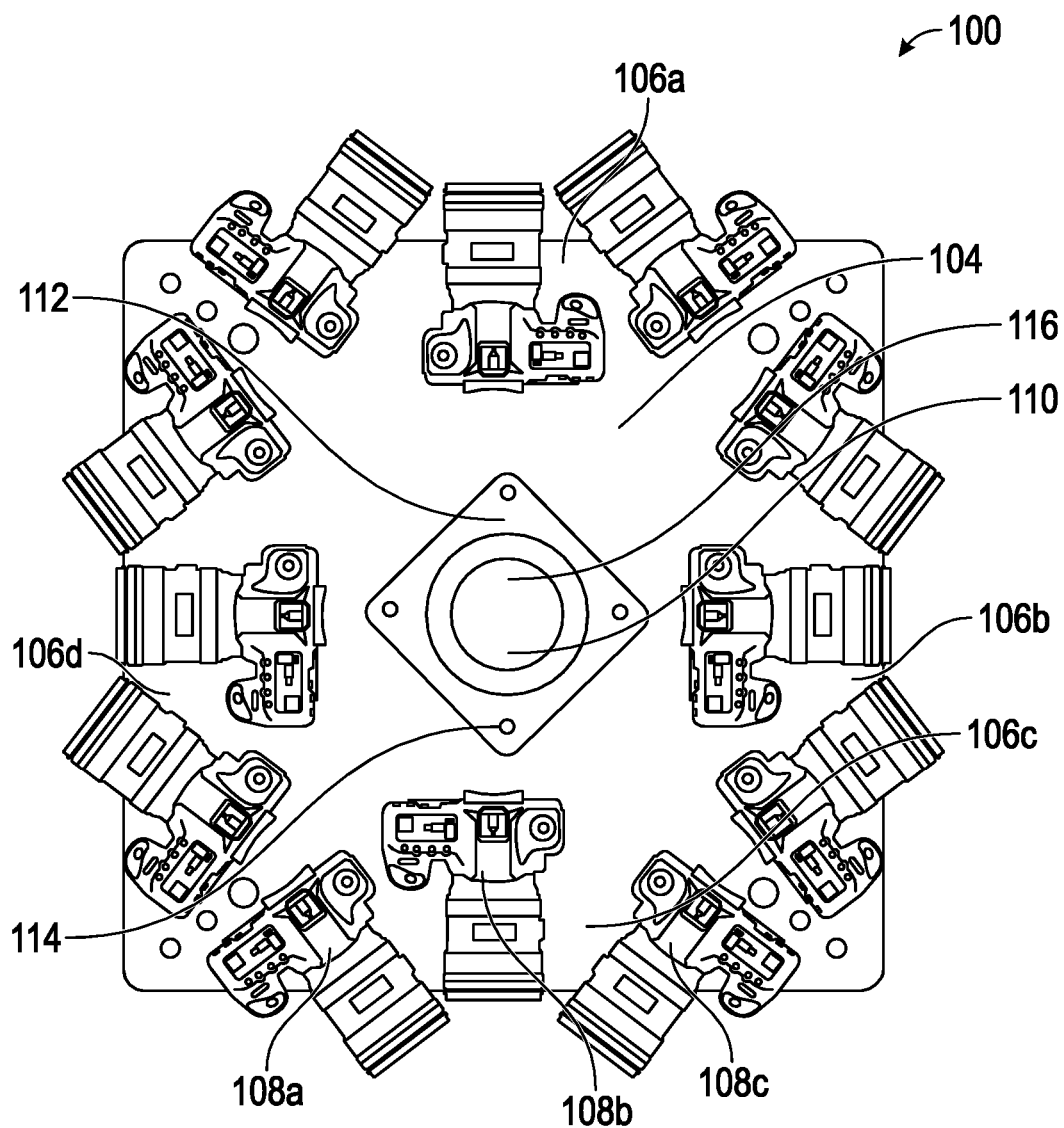
FIG. 1 shows a top view of the system without the video converter boxes connected to the cameras.

The present invention is directed to a system featuring an array of camera arrays configured to capture at least 360 degrees of views from a moving vehicle.

In its most complete version, the system is made up of the following components: a plurality of cameras arranged on each side of a plate structure and connected to a common trigger box and viewing monitor, levelling screws to facilitate the leveling of the plate structure, cut-out features that provide access to the battery of each camera, a lidar and a method of capturing lidar information in conjunction with camera images, and rigid mounts for each camera. These components are combined together to create an architecture for the system that has the ability to capture images at an increased reduction of parallax while providing for a stable image. It should further be noted that the electronic trigger, monitor, leveling screws, battery slots and anti-drift mounts will provide ease of use for the operator and the lidar data will help augment the spatial relation of each image to the others. The spatial relations of the images assist in stitching them together, when necessary.

The cameras will be mounted in four clusters of three along each side of the plate. Thus, each cluster may have a left camera, a middle camera, and a right camera. The four clusters in their nodal formation provide for substantial overlap of the images on each side, thereby reducing parallax. Indeed, the cameras that form each cluster, placed closely and adjacently to each other, are directed toward a point of intersection such that the direction and view of the left camera and right camera cross the direction and view of the middle camera—thus, the angles of views, which are conceptual lines that are positioned and oriented in the very center of views, intersect. Also, the plurality of clusters enable at least a partial overlap of view, not only within each cluster, but between clusters as well. This is because cameras in adjacent clusters may have parallel angles of views.

The plate itself, which via mounting places the cameras on the same horizontal plane, yields two types of overlaps— the first being an overlap of view between one camera with another camera in an adjacent cluster (parallel angles of view), and the second being an overlap of view—but not of angles—between cameras within a cluster. In the latter type of overlap, the angles of view intersect. The common and stable horizontal plane promotes improved outcomes when the images are used to construct 3d and virtual reality spatial environments. In order to supplement the various overlaps in view of the camera array, another camera is placed at the center of the plate and elevated above the plate (and the camera clusters). This camera is directed upward, thereby providing a sky-view to complement the lateral views of the outward-facing camera clusters. Thus, the camera array may feature four outward-facing camera clusters and one upward-facing camera cluster.

Increasing the overlap is possible by increasing the number of clusters or increasing the number of cameras within each cluster. However, doing so will result in increased material and process costs as well as an increased complexity in processing the captured images. Conversely, the number of clusters or the number of cameras within each cluster may be decreased to reduce the aforementioned costs, although this may occur at the expense of the quality of the footage and an increase in parallax errors. It is crucial that the camera views overlap between clusters in order to obtain panoramic coverage from cameras having a common directional view, and that the angles of view intersect within each cluster in order to obtain complete visual information regarding the objects before it. At the same time, the intersection of the angles of view is what enables the overlap between adjacent clusters.

Therefore, in a camera array system of four clusters of three cameras each, the camera angles of view (which may also be understood as the "directions" which the cameras face) of cameras within each cluster should diverge at least fifteen degrees between adjacent cameras, with the "wing" cameras, which are disposed on either side of the "middle" camera, diverging at least thirty degrees. It is preferred for each wing camera to diverge around forty-five degrees from the middle camera so as to diverge ninety degrees from each other. By diverging ninety degrees from each other, a wing camera will maintain the same angle of view as another wing camera in the cluster ninety degrees from its own cluster. Thus, a sufficient degree of divergence guarantees that a wing camera in one cluster will not only overlap in view with a wing camera in an adjacent cluster, but also have common (i.e., parallel) angles of view.

A camera array system of four clusters of four cameras each is similar, except that divergence of angles of view between adjacent cameras may be less while still maintaining the features described above. Thus, the divergence may be as low as ten degrees, but is preferably 22.5. Conversely, a camera array system of four clusters of two cameras may feature a divergence of seventy degrees, although preferably the divergence is ninety degrees.

An electronic trigger relay may be coupled to each camera to provide a simultaneous signal to start or stop capturing footage. The control switch for the electronic trigger relay will be of a length sufficient to permit the operator to control the cameras without having to reach far. Indeed, the control switch for the electronic trigger may be situated remotely, on a central controller, and the central controller may be shaped ergonomically. The electronic trigger relays may be physically mounted to each camera and in instructional communication with the central controller, or the electronic relays may be incorporated into the central controller and in wireless instructional communication with the cameras.

A central monitor system may comprise relay boxes mounted above the cameras and configured to transmit signals from each camera to a common receiver, with the common receiver configured to collate the signals into an image. The central monitor system may include a display screen configured to display the image in real-time. Thus, the central monitor system may permit an operator to view all camera images at once without needing to be at camera level, thereby providing ease of use when the system is mounted high above the operator's head.

The central monitor system may isolate and group sets of cameras within the clusters, such that the footage from a camera within a first cluster will be grouped with the footage from a camera within a second cluster. In particular, footage captured from cameras having the same angle of view may be grouped together in order to obtain overlapping coverage.

The plate structure, i.e., the double plate design consisting of a top and bottom plate, may be advantaged by the inclusion of leveling screws installed at the corners of and between the plates. The levelling screws enable fine adjustments to the horizontal level once all the cameras are mounted on the plate. The levelling screws may comprise a set of rotatable discs threadedly fitted to screws, enabling a change in height via rotation. Three screws within a leveling screw unit enable a planar tilt. Slots may be cut out of the top plate allowing for access to the battery compartment of each camera once mounted. This configuration enables the operator to access the camera battery compartment while ensuring that the camera position does not change once it is mounted to the plate.

While the plate structure, including the top and bottom plates, may be square to better fit a camera array of four clusters, other shapes may provide certain advantages to other array sets. Other conceivable shapes include a circle, a triangle, or other polygons, with the number of sides being equal to the number of clusters.

In one version, 1 to 3-axis gimbals may be mounted at the corners under the bottom plate and provide additional stability to the cameras when the system is in motion, thereby ensuring that a clean image will be captured without aberrations or distorted images. In another version, lens stabilizers are utilized to maintain image clarity and the gimbals are omitted.

A large central cut out on the bottom plate will provide access to the top plate for access to the battery compartments and also for the addition of pins which will be used to attach stabilization rods.

A lidar unit will mount in the center of the system and will sit above the cameras. The lidar data will assist with spatial construction of the captured camera images in 3d software suites. The lidar may communicate distance-related data to the central controller for further processing.

FIG. 1 is a top view of the system 100 with the 13 cameras mounted to the top plate 104 in their respective positions. There are four clusters 106a, 106b, 106c, 106d of three cameras 108a, 108b, 108c arranged in a nodal formation and mounted on the plate every 90 degrees. The center 110 of the plate has a hole through which wires can be connected and through which additional mounting brackets can be placed from underneath. Above the hole is mounted a platform 112 supported by four pins 114 upon which sits a lidar and the 13th camera 116, with the 13th camera mounted to the platform via an L-bracket, with the L-bracket in turn mounted on top of the lidar. The 13th camera is configured to capture the overhead imagery when the system is in use.

Figure 2:
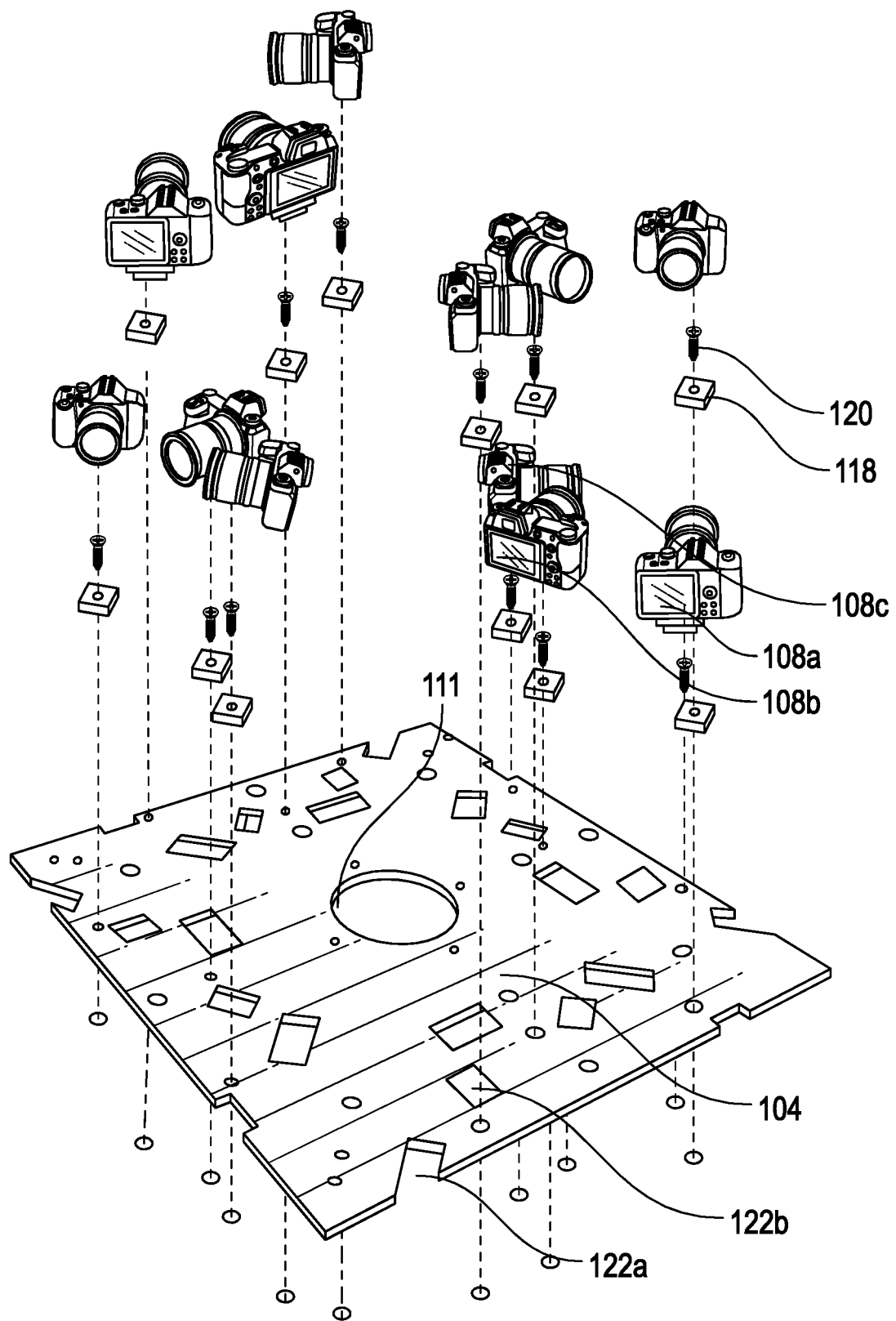
FIG. 2 shows an exploded view of the system with the nodal formation cameras and their respective mounts.

FIG. 2 is an exploded view of the top plate 104 along with the connections needed in order to mount the cameras 108a, 108b, 108c onto the top plate Various rectangular cutouts 122a in the plate are used for access to the battery compartment of each camera after each camera is mounted into position. In one version, each camera has a quick release mount 118 that is connected to the top plate via a bolt 120. An anti-drift plate is mounted to the underside of each of the 12 horizontal cameras and the anti-drift plate is then connected to the quick release plate. Additional slots 122b are also cut into the surface of the plate in order to accommodate a safety lever on the quick release plate. However, in a preferred version, the camera is mounted directly to the top plate and the safety lever and its corresponding slot are omitted.

The hole in the center 111 may be seen when the platform is not attached to the top plate.

Figure 3:
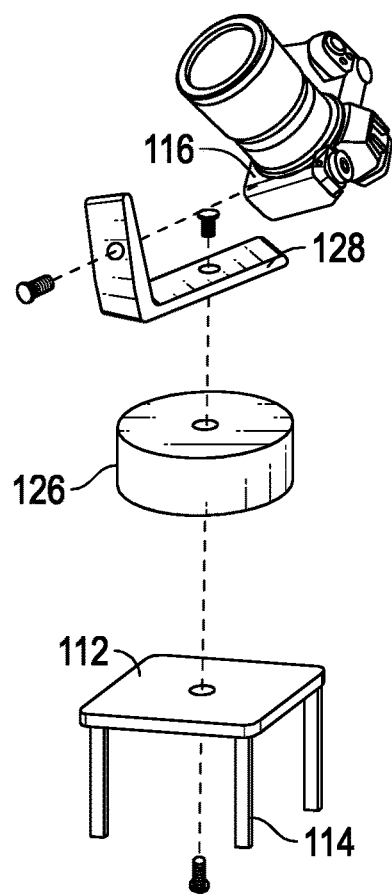
FIG. 3 shows an exploded view of the platform that connects to the top plate and which supports the lidar and overhead camera.

FIG. 3 shows an exploded view of the platform 112 along with the lidar 126 and the 13th camera 116. The lidar is mounted to the platform via a bolt. An L-bracket 128 is then mounted on top of the lidar. Lastly, the camera is mounted onto the L-bracket so that it can be oriented upward. The pins 114 of the platform 112 can be adjusted in order for the lidar to clear the height of the surrounding cameras that are mounted on the perimeter of the platform.

Figure 4:
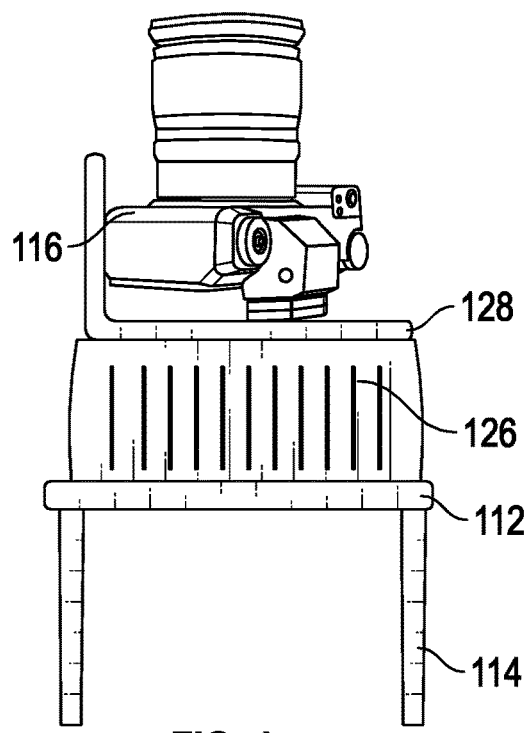
FIG. 4 shows a side view of the platform that connects to the top plate and which supports the lidar and overhead camera.

FIG. 4 shows the configured view from the side of the platform 112 with the lidar 126 and camera 116 mounted. The pins 114 of the platform provide space that allows the cords running from the cameras to the operator to pass. The lidar sits above the platform so that it can capture data in 360 degrees while the system is in use. The camera is mounted via an L bracket 128 to the top of the lidar.

Figure 5:
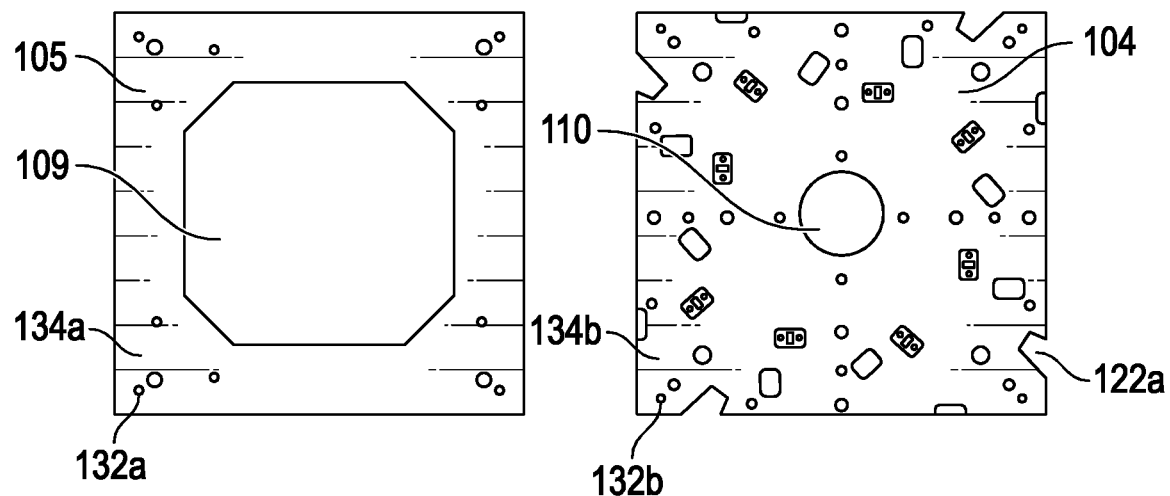
FIG. 5 shows a top view of both the bottom plate (right) and the top plate (left).

FIG. 5 is a top view of the bottom plate (left) 105 and the top plate (right) 104 of the system. The bottom plate features a large cutout 122c in order to provide access to the underside of the top plate. Holes 132a, 132b are placed at the corners 134a, 134b of both the top and bottom plate which provide mounting points for the adjustment screws that are mounted between the plates. The bottom plate also provides holes 109 in order to mount a stabilization gimbal at each corner or in order to attach the bottom plate to a vehicular mount. The top plate 104 is configured to mount the 12 horizontal cameras in nodal formation on each side. The plate provides cutouts 122a in order for the operator to access the battery compartment of each camera while mounted. There is a center hole 110 in the top plate through which cables can be connected to remote units and holes are provided through the plate in order to mount the leveling screws and platform.

Figure 6:
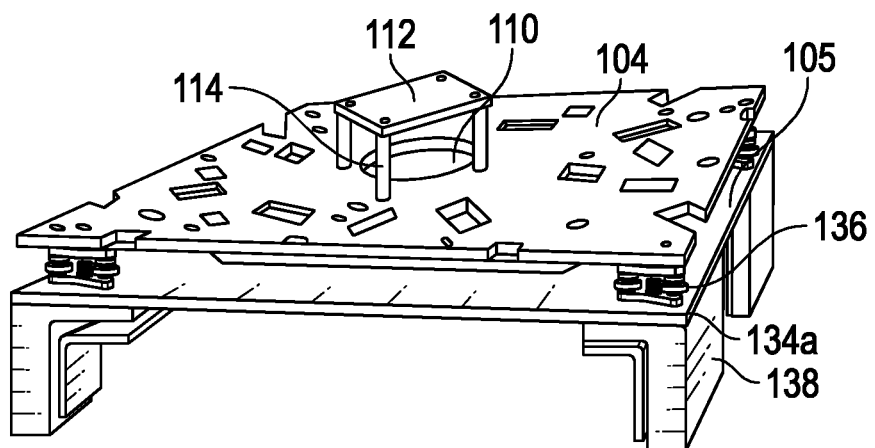
FIG. 6 shows a perspective view of the mounting plates without the cameras.

FIG. 6 is a perspective view of the assembly of the top plate 104, bottom plate 105, leveling screw 136, stabilizing gimbals 138 and platform 112. The stabilizing gimbals are positioned at the corners 134b of the bottom plate in order to provide the most stability possible should the system be moving while in use. The leveling screws are also positioned near the corners 134a and are connected to the top plate. This allows the operator to conduct any fine leveling adjustments needed after the initial mounting of the system has been completed. In a preferred version, the gimbals may be omitted and the bottom plate may be attached directly to a vehicular mounting bracket. There is a large hole in the bottom plate and a smaller hole (the center hole) 110 in the top which provides access for cables to be passed through. The platform 112 has four pins 114 which sit higher than the surrounding cameras when they are mounted in order to capture lidar data.

Figure 7:
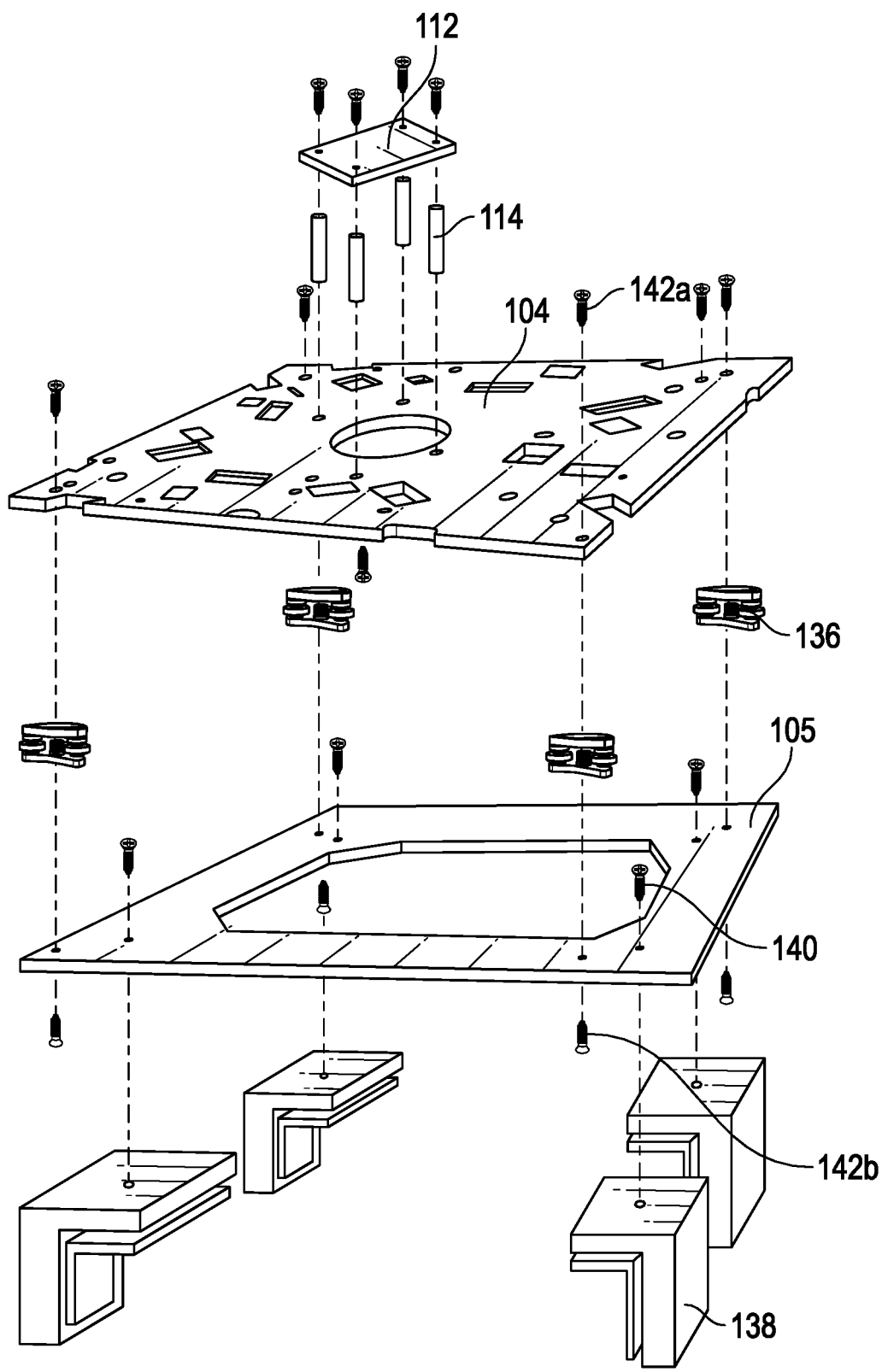
FIG. 7 shows an exploded view of the mounting plates without the cameras.

FIG. 7 is an exploded view of the assembly of the top plate 104, bottom plate 105, platform 112, leveling screws 136 and stabilizing gimbals 138. The stabilizing gimbals are connected to the underside of the bottom plate with a bolt 140. The leveling screws are connected to both the top and bottom plates with a bolt 142a, 142b on each end. Discs 144 embedded into the leveling screw rotate clockwise or counterclockwise in order to lengthen or shorten the (leveling) screw. A plurality of discs surround an approximate center of each levelling screw to enable a planar tilt of upper and lower levels of each levelling screw. As each levelling screw's length and planar tilt is changed the overall balance and level of the top plate is assessed and adjusted. The platform 112 is mounted to the top plate with bolts connected to pins 114. Different lengths of pins can be used for the event that the height of the lidar needs to be adjusted.

Figure 8:
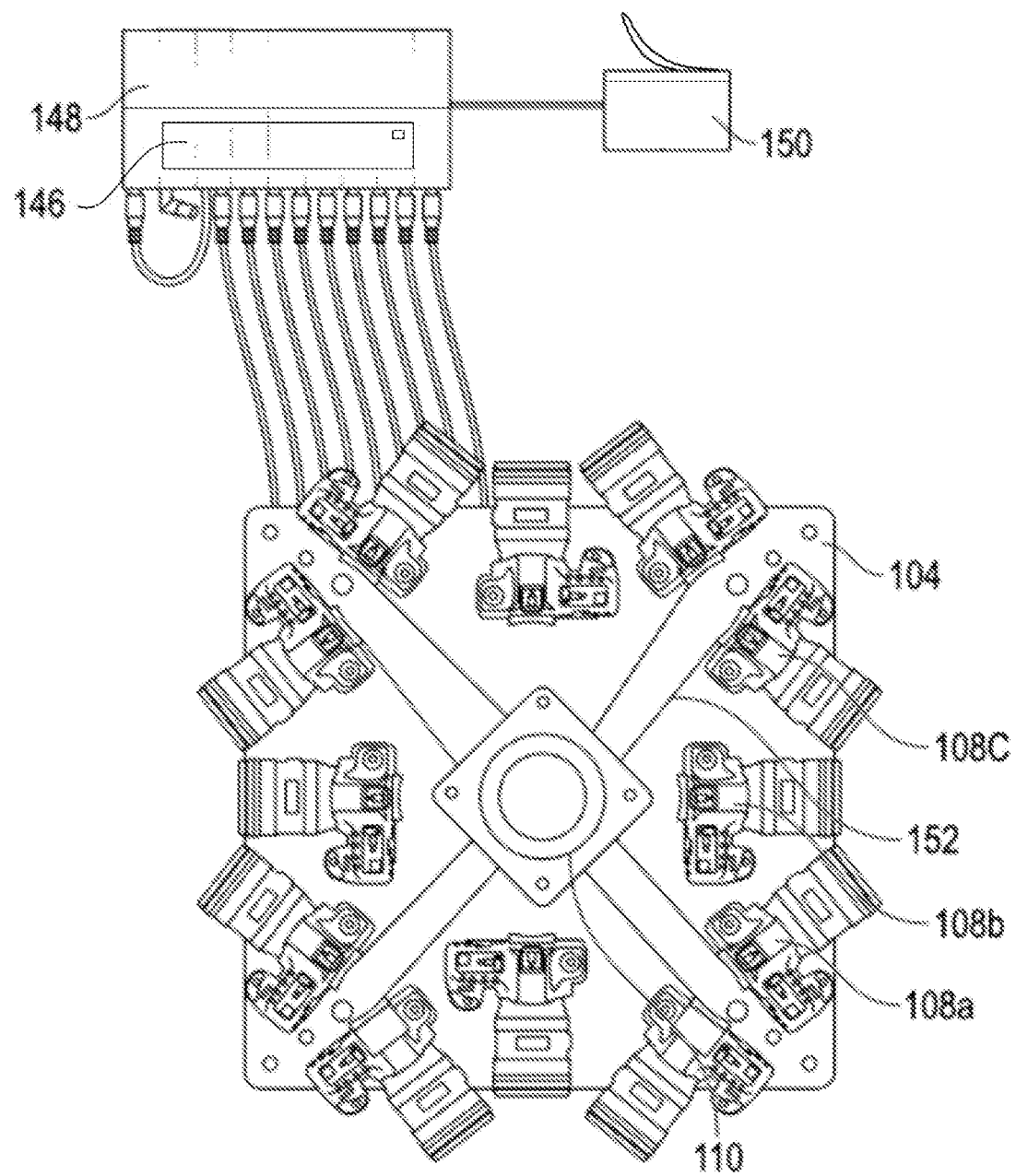
FIG. 8 shows the electronic trigger relay leading from the camera to the control box and trigger.

FIG. 8 shows the top view of the cameras 108a, 108b, 108c mounted on the top plate 104 with the electronic trigger relay 146 connected from the camera, to a central relay box 148 and then to a central trigger 150. The electronic trigger box allows simultaneous activation of the cameras from a central source so that the operator has adequate control over all the cameras at once. The figure shows a cable 152 running from each camera to the hole located at the center 110 of the plate. The cables then pass through the holes in the top and bottom plates and are connected to a common electronic relay box. The box is then connected to a single trigger that sends a signal to the cameras to begin recording all at the same time. The trigger will then send a signal when image capture is complete in order pause the cameras. The trigger may connect to the cameras via the cables, but in a preferred version, the trigger and cameras are coupled remotely and wirelessly, with the trigger wirelessly engaged to receiver boxes connected to each camera. The trigger, in turn, may be attached to otherwise incorporated into the central relay box, which may be a handheld device enabling centralized and remote control across the camera array. Accordingly, both the cables and the hole through which they pass may be omitted. The platform and pin structure may be replaced by an elevated platform of any shape.

Figure 9:
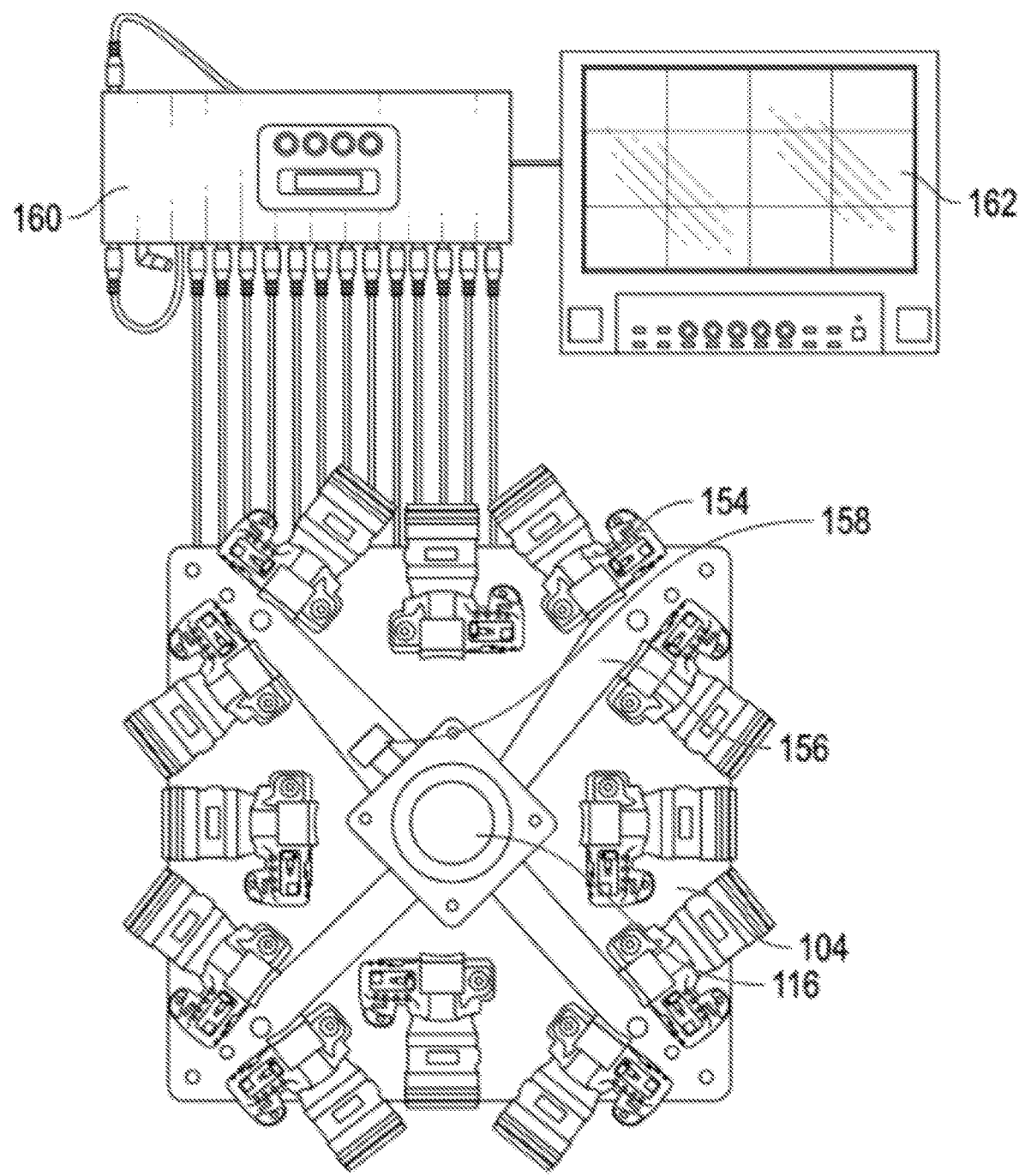
FIG. 9 shows a monitor system in which visual data is communicating from the cameras to the video converter boxes, and from the video converter boxes to the monitor.

FIG. 9 shows a top view of the cameras mounted on the top plate 104 with the video converter boxes 154 attached to the "hot shoe" mount on the top of each camera. An additional video converter box 158 is mounted to the top plate itself for the overhead camera 116. The video converter boxes connect to the cameras and send a video signal through a cable 156 to a central control box 160. The central control box then connects to a video monitor 162 which can provide images of one, some or all cameras on the same screen at the same time in order for the operator to check the status of each camera without needing to be above the top plate.

Figure 11:
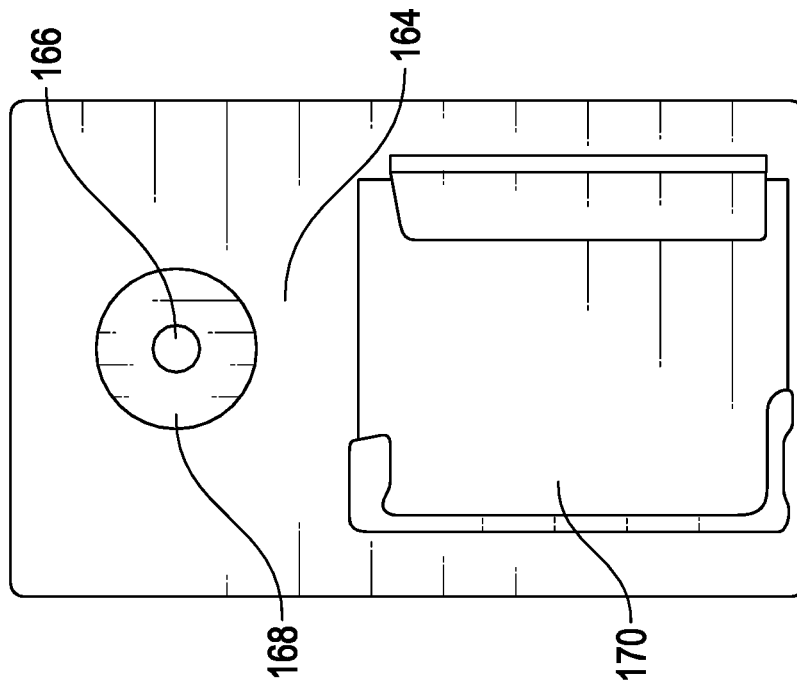
FIG. 11 shows a bottom view of the anti-drift camera mounting plate.
Figure 12:
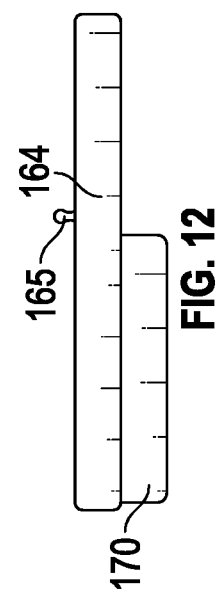
FIG. 12 shows a side view of the anti-drift camera mounting plate.
Figure 10:
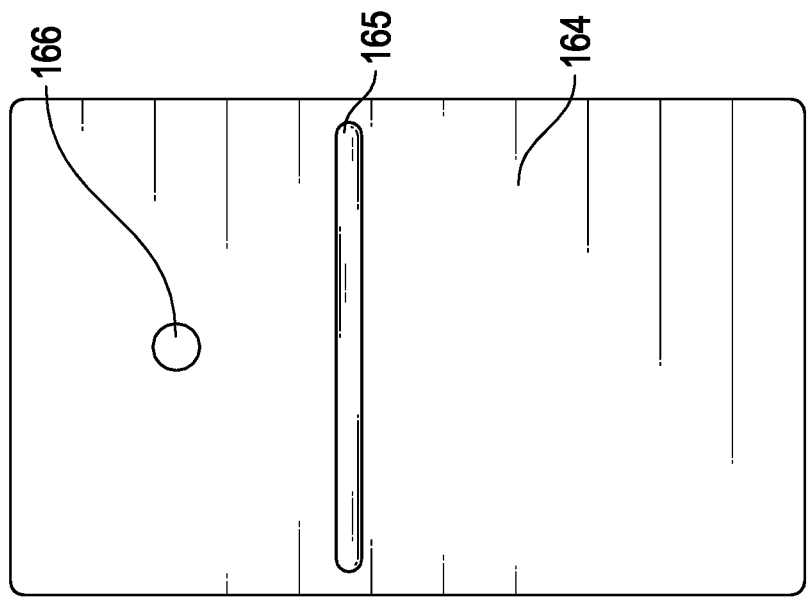
FIG. 10 shows a top view of the anti-drift camera mounting plate.

FIGS. 10-12 show components that may be omitted, depending on the stabilization methods, techniques, and components incorporated elsewhere in the system.

FIG. 10 shows a top view of the anti-drift plate 164 that connects to the bottom of each of the horizontal cameras on the top plate. This side of the plate has a hole 166 through which a bolt connects to the underside of the camera. The camera would sit on top of this plate and, after mounting the plate via the bolt through the hole, the rigid bulk of material situated across the body of the unit will keep the camera in one position. Without the material on the surface of the mount, the camera will have a tendency to rotate around the bolt hole and change position. The rigid bar 165 on the surface of the mount prevents the camera from drifting, especially when it is filming while moving on a vehicle.

FIG. 11 is the bottom view of the anti-drift plate 164. The hole 166 has a recess 168 to prevent the head of the bolt from hanging down below the underside of the plate. The lower portion of the plate, a quick release mounting surface 170 is the shape that will engage the quick release plate on the top plate of the system in order to fully mount each camera.

FIG. 12 is a side view of the anti-drift plate 164 which shows the rigid bar 165 running across the surface of the plate which prevents the camera from rotating around the mounting hole. On the underside of the plate is the mounting surface 170 which engages the quick release plate on the top plate of the system.

Figure 13:
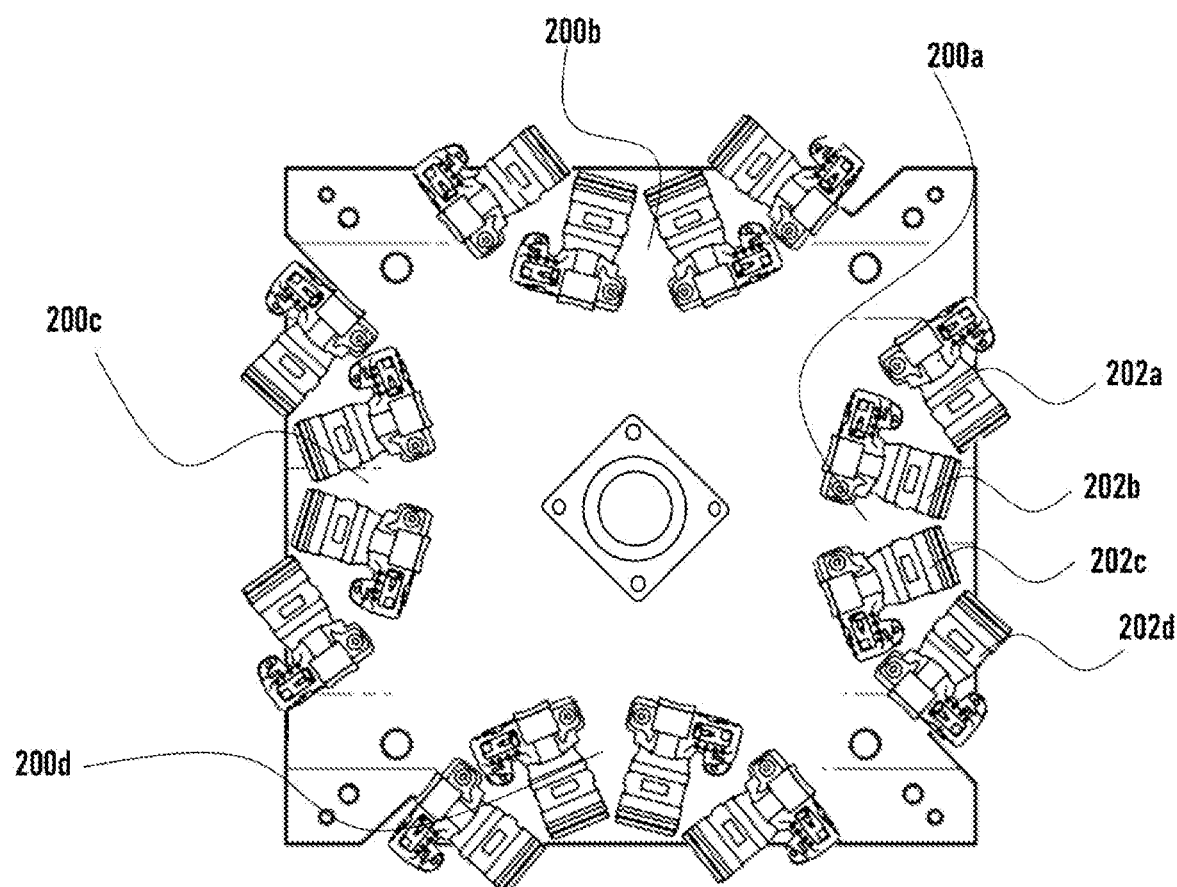
FIG. 13 shows a top view of a camera array system with four outward-facing camera clusters of four cameras each.

FIG. 13 is a top view of a camera array system with four outward-facing camera clusters 200a, 200b, 200c, 200d of four cameras 202a, 202b, 202c, 202d each.

Figure 14:
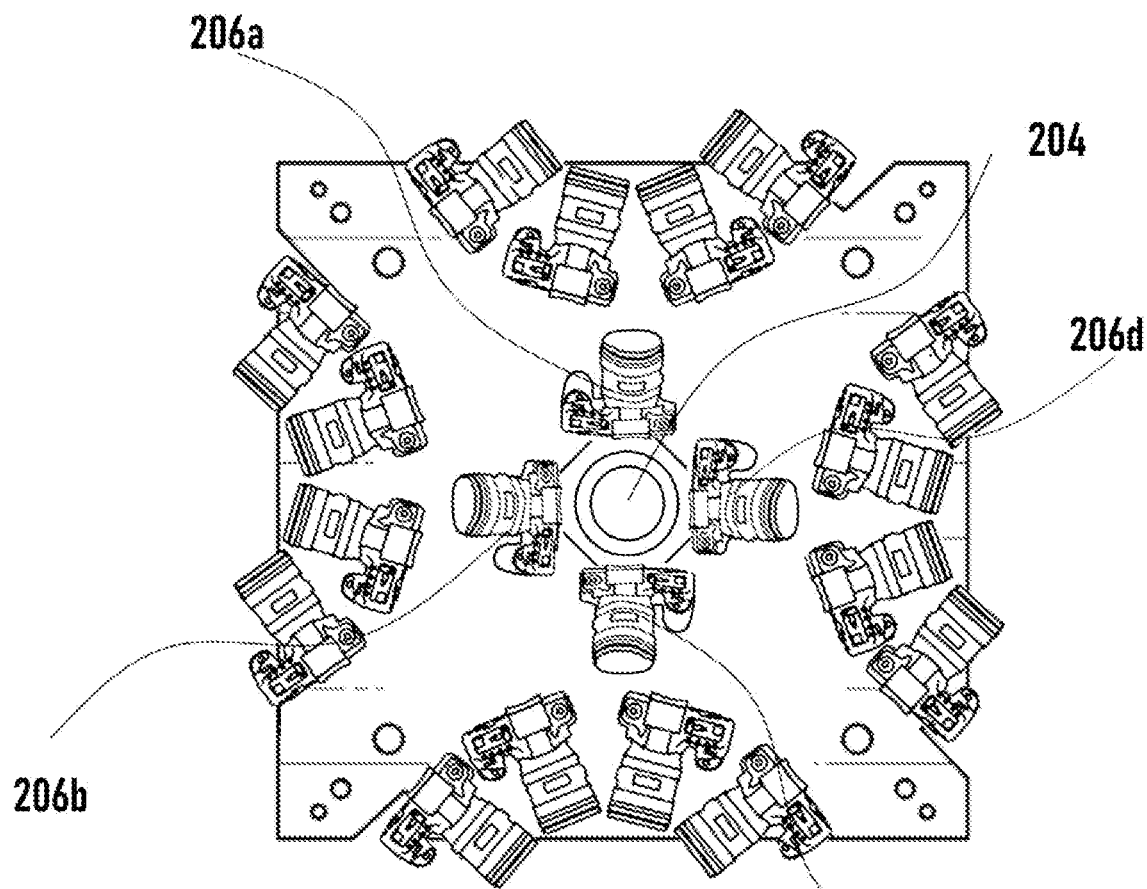
FIG. 14 shows a top view of a camera array system with an upward-facing camera cluster of five cameras.
Figure 15:
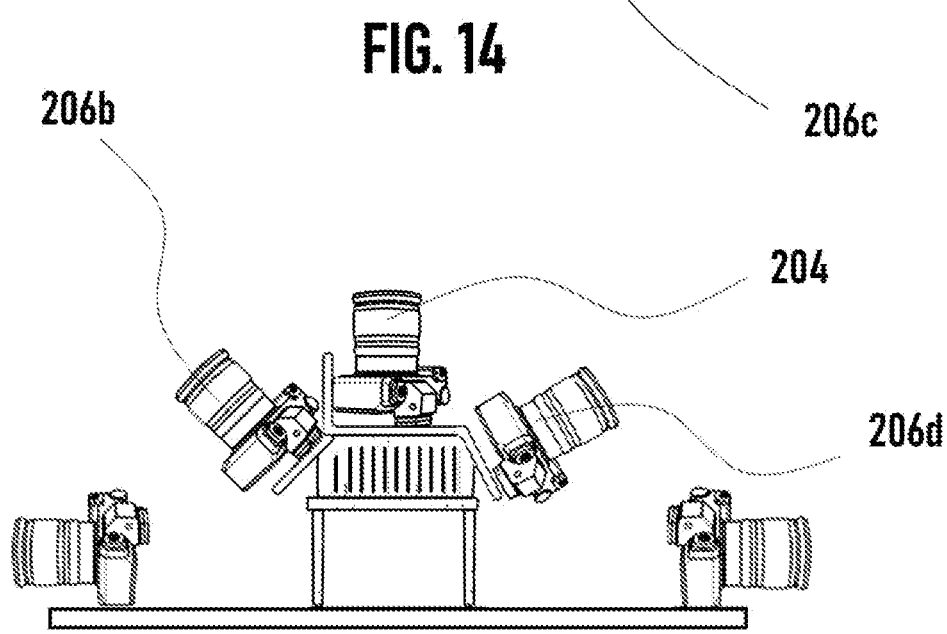
FIG. 15 shows a side view of a camera array system with an upward-facing camera cluster of five cameras.

FIG. 14-15 show a top and side view of a camera array system with an upward-facing camera cluster 204 of five cameras 206a, 206b, 206c, 206d.

Figure 16:
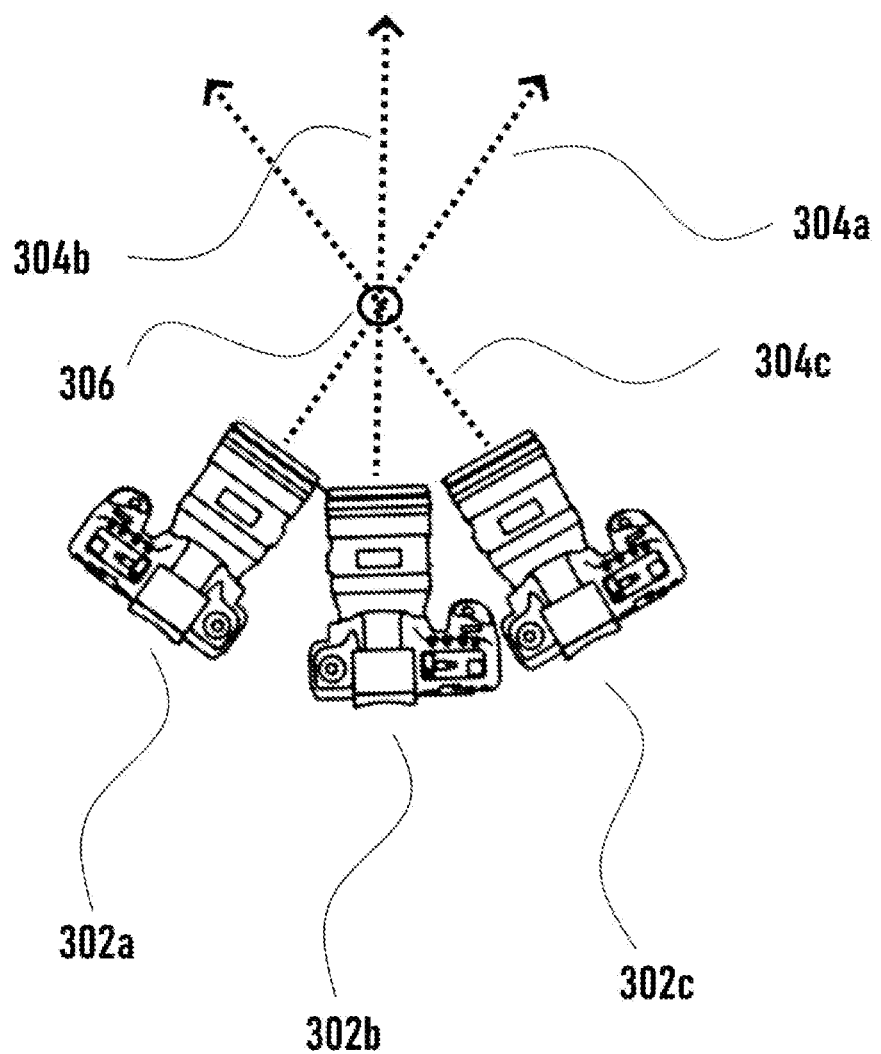
FIG. 16 shows a camera cluster with the corresponding angles of view and the point of intersection.

FIG. 16 shows a camera cluster of three cameras 302a, 302b, and 302c, with the corresponding angles of view 304a, 304b, 304c, and the point of intersection 306.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments.

It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

Figure 17A:
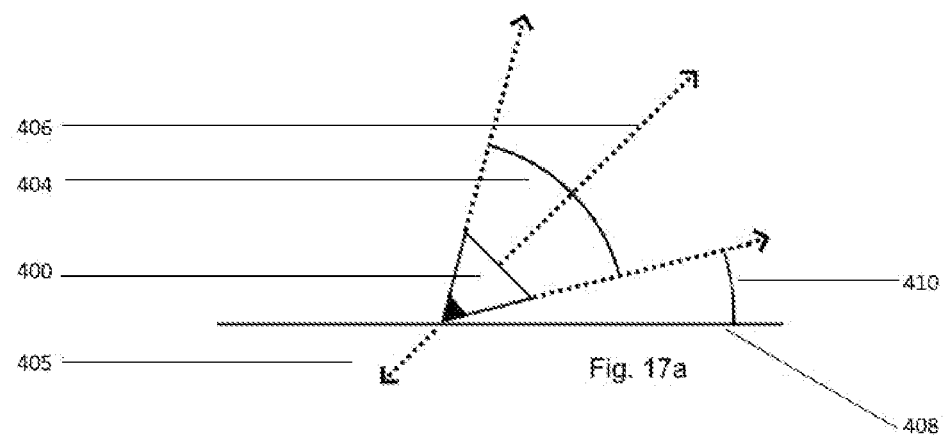
FIG. 17a is a schematic of an upward-facing camera in which the upward-facing camera has am upward direction less than 90 degrees above the plate.
Figure 17B:
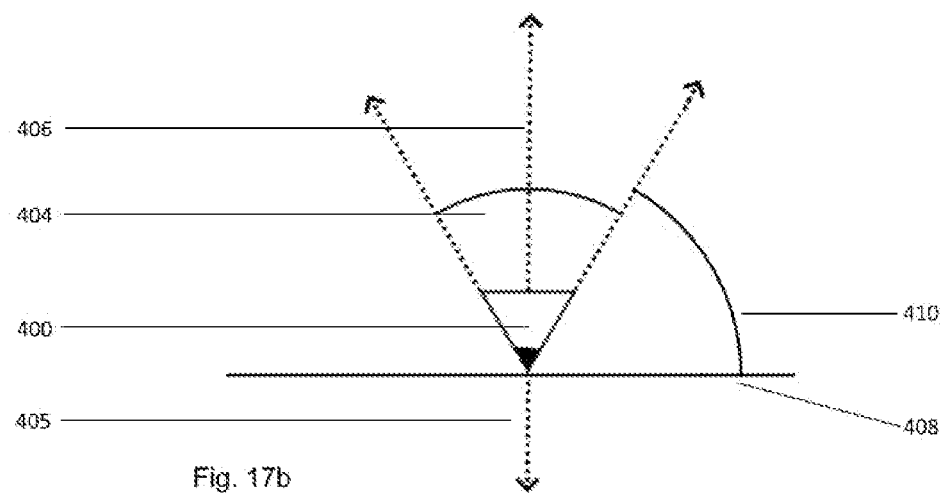
FIG. 17b is a schematic of an upward-facing camera in which the upward-facing camera has an upward direction approximately 90 degrees above the plate.

As shown in FIG. 17a-b, the camera array system may comprise upward facing cameras 400. The cameras have fields of view 404 and optical axes 406 which pass orthogonally through centers of the fields of view. The field of view is an extent of the world visible at any moment by the camera, and the optical axis comprises a line passing from a center of the camera lens through the very center of the field of view. An optical axis may be referred to, colloquially, as the camera's "direction". However the optical axis extends both forwards, as would be consistent with the "direction", as well as backwards, passing through the lens and extending behind the lens. Thus, an optical axis may comprise both a forward direction as well as a backward direction 405, with the forward direction and the backward direction both occupying the same optical axis but facing opposite ends of the optical axis.

Upward facing cameras may be directed upward from the plate 408 at an angle 410 between 0-90 degrees. The cameras may be fixedly or adjustably directed upward from the plate, to which it may be attached directly or indirectly via one or more mechanical intermediaries. Such intermediaries may include platforms, stages, or other props to stabilize and connect the cameras.

There camera array system may provide for a series of sets of upward facing cameras, with each set being at a different angle. In one variation, a first set of upward facing cameras are directed approximately 90 degrees from the plate, a second set are directed upward between approximately 75 and 90 degrees, a third set are directed upward between approximately 60 and 75 degrees, a fourth set are directed upward approximately 60 degrees, a fifth set are directed upward between approximately 45 and 60 degrees, a sixth set are directed upward between approximately 30 and 45 degrees, a seventh set are directed upward between approximately 15 and 30 degrees, and an eight set are directed upward between approximately 0 and 15 degrees. The upward facing cameras may be used in conjunction with sets of outward facing cameras, as described previously, which may be angled at approximately 0 degrees from the plate. Unless mentioned otherwise, it can be assumed that any of the upward facing cameras described below are angled less than 90 degrees upward from the plate, and therefore are capable of having (forward or backward) directions with common points of intersection, as will be described.

Figure 18:
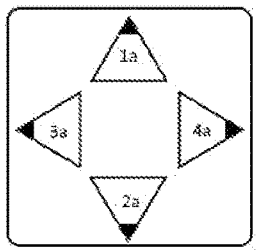
FIG. 18 is a schematic of a camera array system featuring a cluster of four cameras.

As shown in FIG. 18, the camera array system may feature a cluster of four upward facing cameras (1*a*, 2*a*, 3*a*, and 4*a*), with the upward facing cameras targeting a common point in space. Therefore, the directions of the cameras may have a common point of intersection. This common point of intersection will be above the cameras at a distance corresponding to the distance between the cameras. The cameras may be spaced approximately equidistantly around a center point, such that a first camera is disposed at approximately 0 degrees, a second at approximately 90 degrees, a third at 180 degrees, and a fourth at 270 degrees. The center between the cameras may align with the central axis of the car and therefore substantially in line with the direction of the moving vehicle. In one variation, the center is to the left of the central axis of the car. In another variation, the center is to the right of the central axis.

In one variation, the cameras are positioned with respect to the direction or path of the moving vehicle onto which the plate is mounted such that the first camera is directed toward, although above, the direction of the moving vehicle. The second camera is directed opposite, although above, the direction of the moving vehicle. The third camera is directed perpendicular to, although above, and to the right of the direction of the moving vehicle. The fourth camera is directed perpendicular to, although above, and to the left the direction of the moving vehicle. In another variation, the first camera is directed approximately 45 degrees to the left of the forward direction, in addition to designated degrees above it. The second camera is directed approximately 45 degrees to the right of the forward direction, in addition to designated degrees above it. The third camera is directed approximately 135 degrees to the left of the forward direction, in addition to designated degrees above it. The fourth camera is directed approximately 135 degrees to the right of the forward direction, in addition to designated degrees above it.

Figure 19:
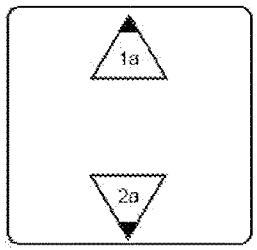
FIG. 19 is a schematic of a camera array system featuring a cluster of two upward-facing cameras.

As shown in FIG. 19, the camera array system may feature a cluster of two upward facing cameras (1*a*, 2*a*), with the upward facing cameras targeting a common point in space. As before, the directions of the cameras may have a common point of intersection. The cameras may be spaced approximately equidistantly around a center point, such that the first camera is disposed at approximately 0 degrees and the second camera is disposed at approximately 180 degrees. The center between the cameras may align with the central axis of the car and therefore substantially in line with the direction of the moving vehicle. In one variation, the center is to the left of the central axis of the car. In another variation, the center is to the right of the central axis.

In one variation, the cameras are positioned with respect to the direction or path of the moving vehicle such that a first camera is directed toward, although above the direction of the moving vehicle, and the second camera is directed opposite, although above, the direction of the moving vehicle. In another variation, the first camera is directed perpendicular to, although above, and to the right of the direction and the second camera is directed perpendicular to, although above, and to the left of the direction of the moving vehicle. The center between the cameras may align with the central axis of the car and therefore substantially in line with the direction of the moving vehicle.

Figure 20:
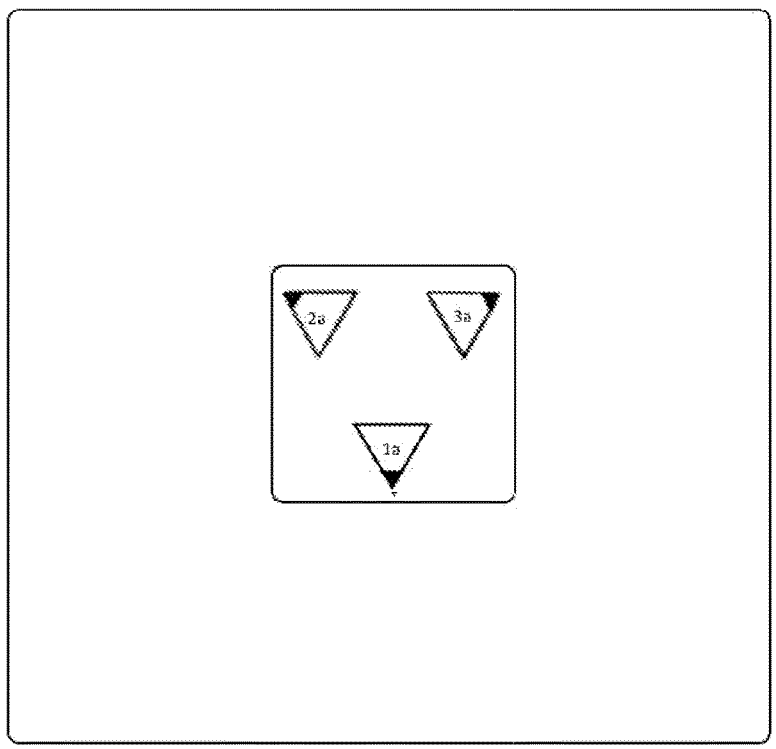
FIG. 20 is a schematic of a camera array system featuring a cluster of three upward-facing cameras.

As shown in FIG. 20, the camera array system may feature a cluster of three upward facing cameras (1*a*, 2*a*, and 3*a*), with the upward facing cameras targeting a common point in space. As before the directions of the cameras may have a common point of intersection. The cameras may be spaced approximately equidistantly around a center point, such that the first camera is disposed at approximately 0 degrees, the second camera is disposed at approximately 120 degrees, and the third camera is disposed at approximately 240 degrees. The center between the cameras may align with the central axis of the car and therefore substantially in line with the direction of the moving vehicle. In one variation, the center is to the left of the central axis of the car. In another variation, the center is to the right of the central axis.

In one variation, the cameras are positioned with respect to the direction or path of the moving vehicle such that a first camera is directed toward, although above the direction of the moving vehicle. The second camera is directed approximately 120 degrees to the left of, in addition to designated degrees above, the direction of the moving vehicle. The third camera is directed approximately 120 degrees to the right of, in addition to designated degrees above, the direction of the moving vehicle. In another variation, the first camera is directed 180 degrees from, in addition to designated degrees above, the direction of the moving vehicle. The second camera is directed 60 degrees to the left of, in addition to designated degrees above, the direction of the moving vehicle. The third camera is directed 60 degrees to the right of, in addition to designated degrees above, the direction of the moving vehicle.

Figure 21:
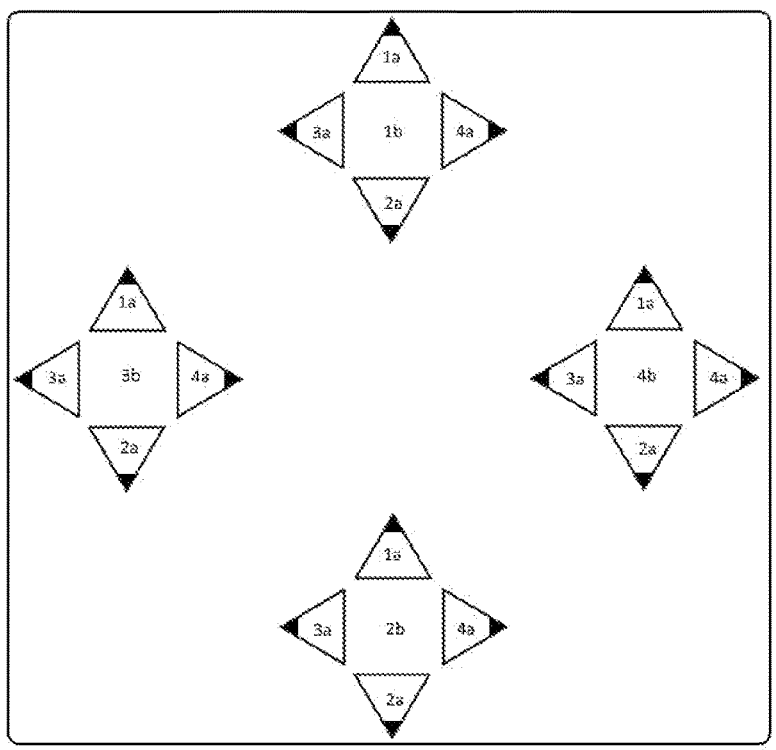
FIG. 21 is a schematic of a camera array system featuring four clusters of four upward-facing cameras.

As shown in FIG. 21, the camera array system may feature four clusters (1*b*, 2*b*, 3*b*, and 4*b*) of the type shown in FIG. 18. The camera clusters may be spaced approximately equidistantly around a center point, such that the first camera cluster is disposed at approximately 0 degrees, the second at approximately 180 degrees, the third at 270 degrees, and the fourth at 90 degrees. This camera array system enables a combination of parallel directions and intersecting forward directions between cameras of different clusters having intersecting points. Intersecting forward directions occur between, first, camera 1a of cluster 1b and camera 2a of cluster 2b, and second, camera 3a of cluster 3b and camera 4a of cluster 4b. Parallel directions occur amongst, first, cameras 1a of each cluster, second, cameras 2a of each cluster, third, cameras 3a of each cluster, and fourth cameras 4a of each cluster. The combination of intersecting forward directions and parallel directions enable superior stitching of footage. In general and throughout, cameras must have the same angle upward from the plate in order for parallel directions to be possible.

Figure 22:
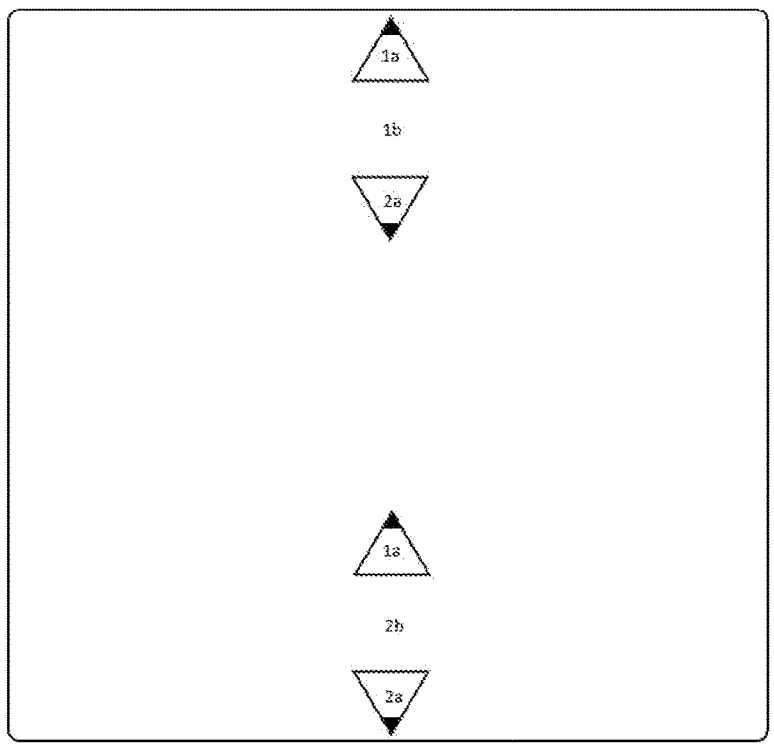
FIG. 22 is a schematic of a camera array system featuring two clusters of two upward-facing cameras.

As shown in FIG. 22, the camera array system may feature two clusters (1a and 1b) of the type shown in FIG. 19. The camera clusters may be spaced approximately equidistantly around a center point, such that the first camera cluster is disposed at approximately 0 degrees and the second is disposed at approximately 180 degrees. Intersecting forward directions occur between camera 1a of cluster 1b and camera 2a of cluster 2b. Parallel directions occur amongst, first, camera 1a of cluster 1b and camera 1a of cluster 2b, and second, camera 2a of cluster 1b and camera 2a of cluster 2b.

Figure 23:
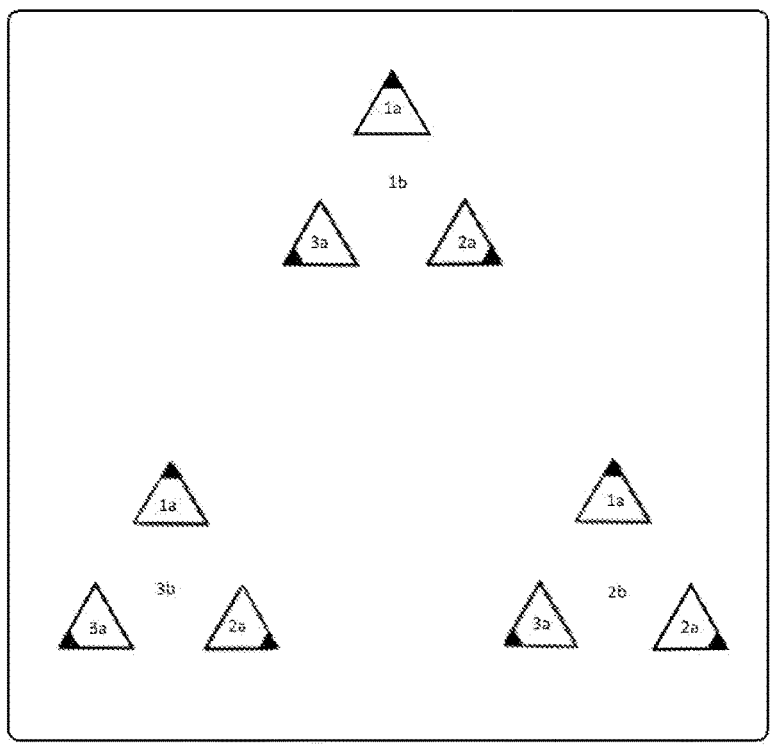
FIG. 23 is a schematic of a camera array system featuring three clusters of three upward-facing cameras.

As shown in FIG. 23, the camera array system may feature three clusters of the type shown in FIG. 20. The camera clusters may be spaced approximately equidistantly around a center point, such that the first camera cluster is disposed at approximately 0 degrees, the second is disposed at approximately 120 degrees, and the third is disposed at approximately 240 degrees. Intersecting forward directions occur between camera 1a of cluster 1b, camera 2a of cluster 2b, and camera 3a of cluster 3b. Parallel directions occur amongst, first, cameras 1a of each cluster, second, cameras 2a of each cluster, and third, cameras 3a of each cluster.

Figure 24:
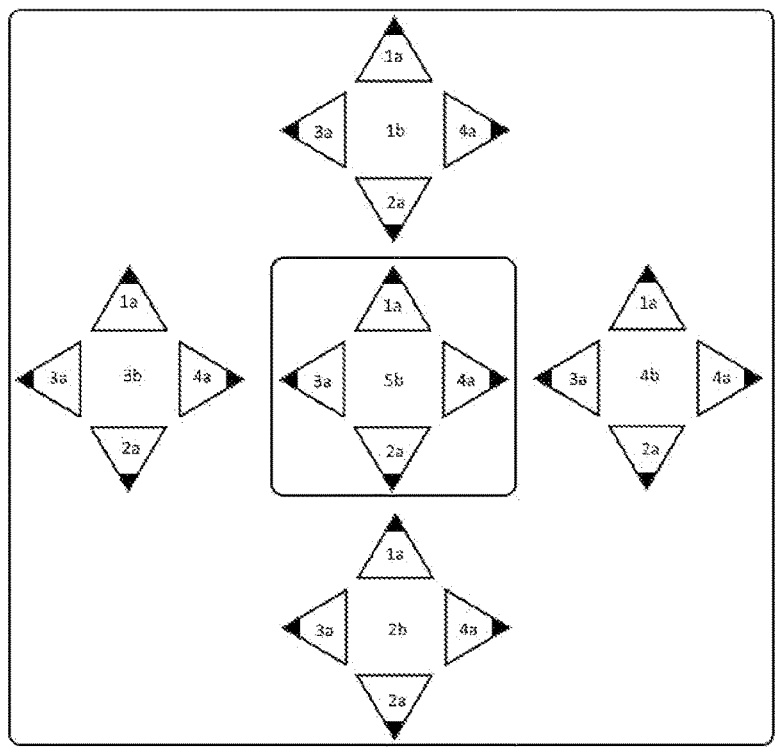
FIG. 24 is a schematic of a camera array system featuring five clusters of four upward-facing cameras.

As shown in FIG. 24, the camera array system may feature the four clusters of the type shown in FIG. 21, with an additional fifth cluster (5b) disposed in the approximate center of the four clusters. Amongst the cameras of cluster 5b, camera 1a can be included in the first parallel direction referenced for FIG. 21, camera 2a can be included in the second parallel direction, camera 3a can be included in the third parallel direction, and camera 4a can be included in the fourth parallel direction. Additional intersecting forward directions may occur between cameras 1a, 2a, 3a, and 4a of cluster 5b with, respectively, camera 2a of cluster 2b, camera 1a of cluster 1b, camera 4a of cluster 4b, and camera 3a of cluster 3b.

Figure 25:
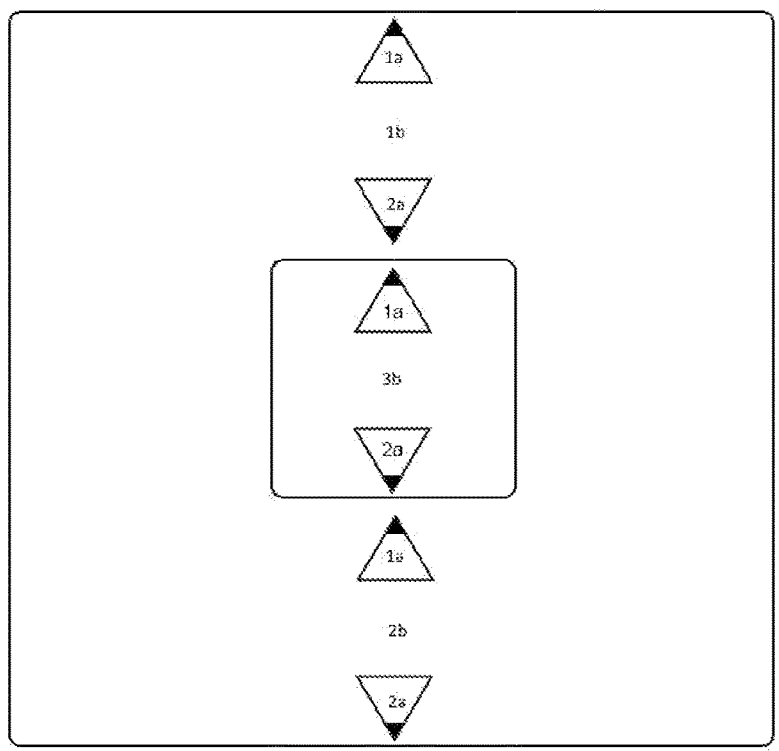
FIG. 25 is a schematic of a camera array system featuring three clusters of two upward-facing cameras.

As shown in FIG. 25, the camera array system may feature the two clusters of the type shown in FIG. 22, with an additional third cluster (3b) disposed between the two clusters. Amongst the cameras of cluster 3b, camera 1a can be included in the first parallel direction and camera 2a can be included in the second parallel direction. Additional intersecting forward directions may occur between cameras 1a and 2a of cluster 3b with, respectively, camera 2a of cluster 2b and camera 1a of cluster 1b.

Figure 26:
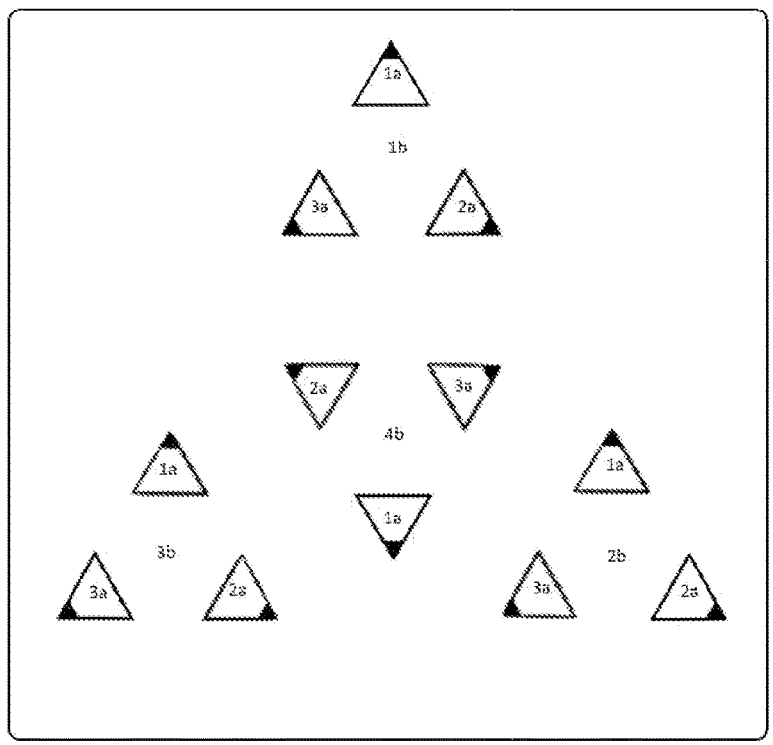
FIG. 26 is a schematic of a camera array system featuring four clusters of three upward-facing cameras.

As shown in FIG. 26, the camera array system may feature the three clusters of the type shown in FIG. 23, with an additional fourth cluster (4b) disposed in the approximate center of the three clusters. No additional parallel directions may be enabled by this configuration, but additional intersecting forward directions may occur between cameras 1a, 2a, and 2a of cluster 4b with, respectively, camera 1a of cluster 1b, camera 2a of cluster 2b, and camera 3a of cluster 3b.

Figure 27:
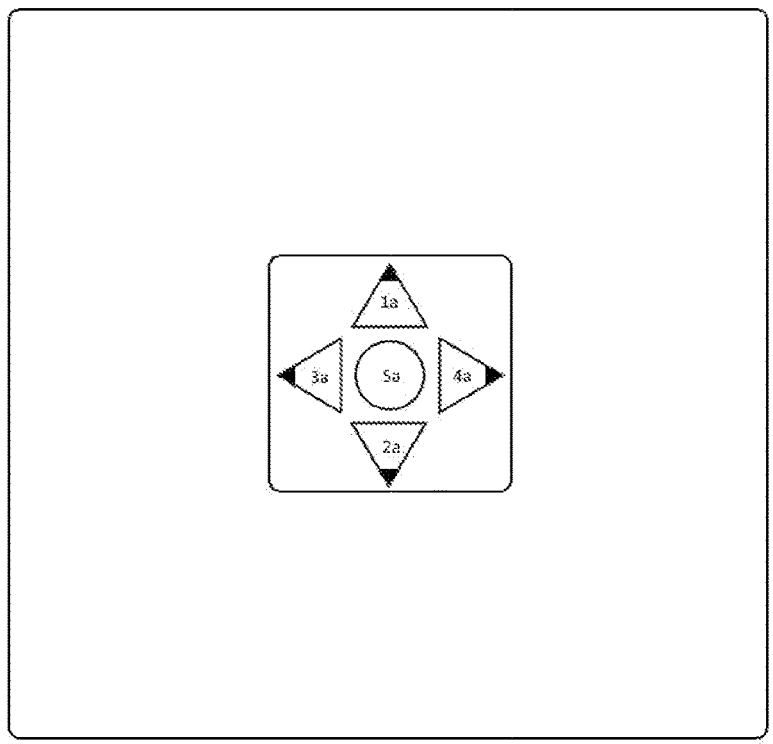
FIG. 27 is a schematic of a camera array system featuring a cluster of five upward-facing cameras.

As shown in FIG. 27, the camera array system may feature the four-camera cluster of the type shown in FIG. 18, with an additional camera 5a. Camera 5a is angled approximately 90 degrees from the plate, and therefore its forward direction intersects those of cameras 1a, 2a, 3a, and 4a.

Figure 28:
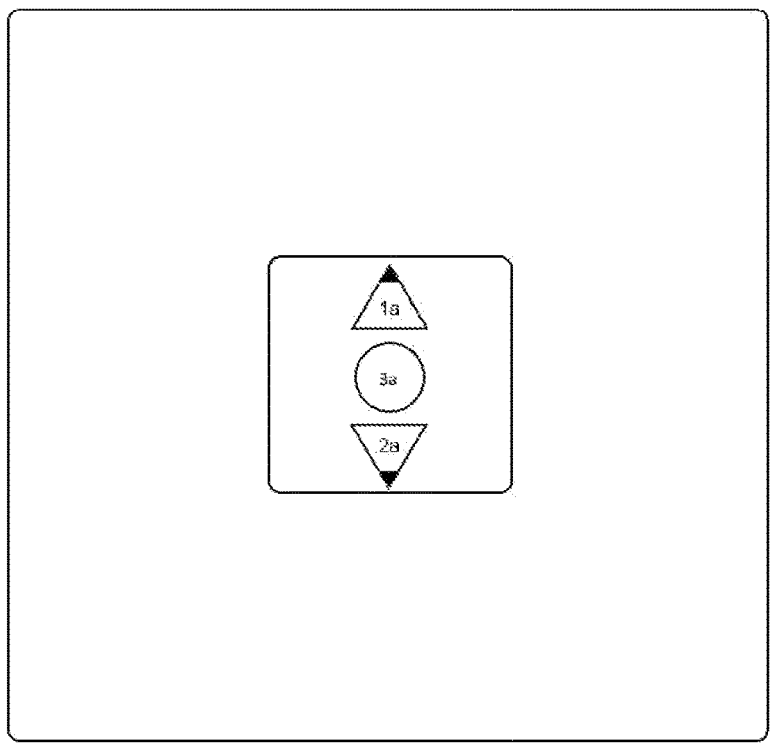
FIG. 28 is a schematic of a camera array system featuring a cluster of three upward-facing cameras.

As shown in FIG. 28, the camera array system may feature the two camera cluster of the type shown in FIG. 19, with an additional camera 3a. Camera 3a is angled approximately 90 degrees from the plate, and therefore its forward direction intersects those of cameras 1a and 2a.

Figure 29:
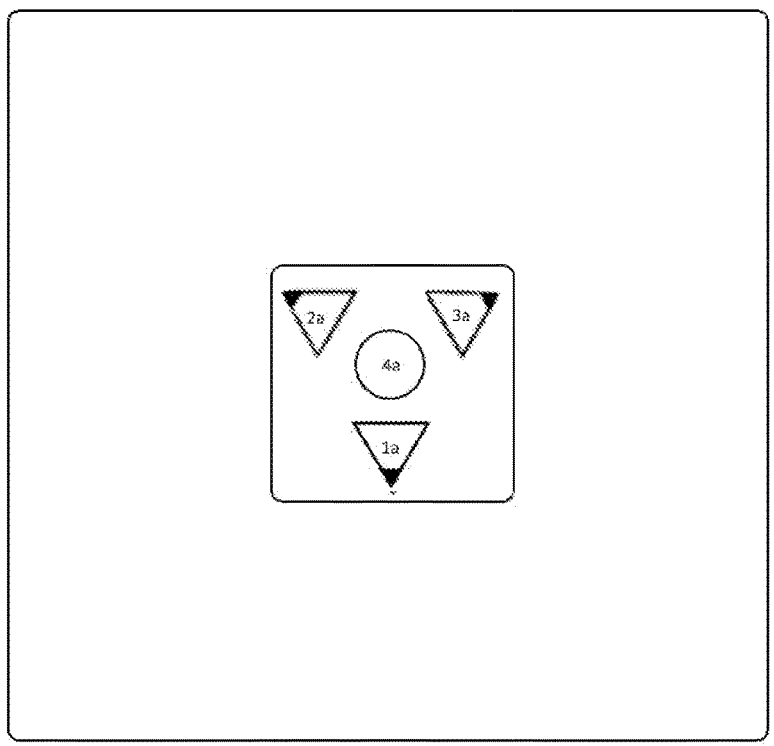
FIG. 29 is a schematic of a camera array system featuring cluster of four upward-facing cameras.

As shown in FIG. 29, the camera array system may feature the three camera cluster of the type shown in FIG. 20, with an additional camera 4a. Camera 4a is angled approximately 90 degrees from the plate, and therefore its forward direction intersects those of cameras 1a, 2a, and 3a.

Figure 30:
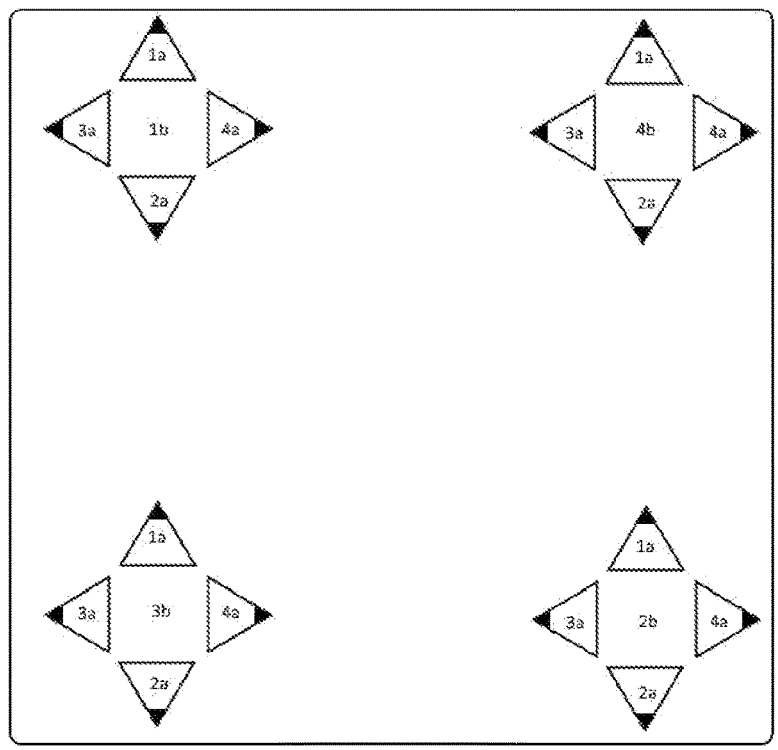
FIG. 30 is a schematic of a camera array system featuring four clusters of four upward-facing cameras.

As shown in FIG. 30, the camera array system may feature a modified version of the four camera cluster of the type shown in FIG. 21. This configuration provides for the same parallel view engagements amongst the cameras; however, the intersecting forward directions are different: first, camera 1a of cluster 1b with camera 2a of cluster 3b, second, camera 1a of cluster 4b with camera 2a of cluster 2b, third, camera 3a of cluster 1b with camera 4a of cluster 4b, and fourth, camera 3a of cluster 3b with camera 4a of cluster 2b.

Figure 31:
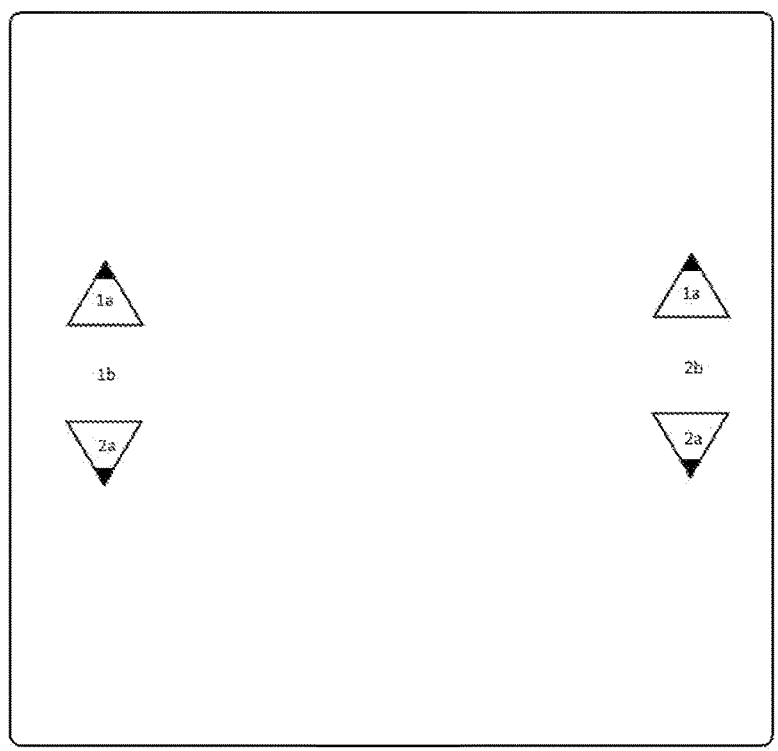
FIG. 31 is a schematic of a camera array system featuring two clusters of two upward-facing cameras.
Figure 32:
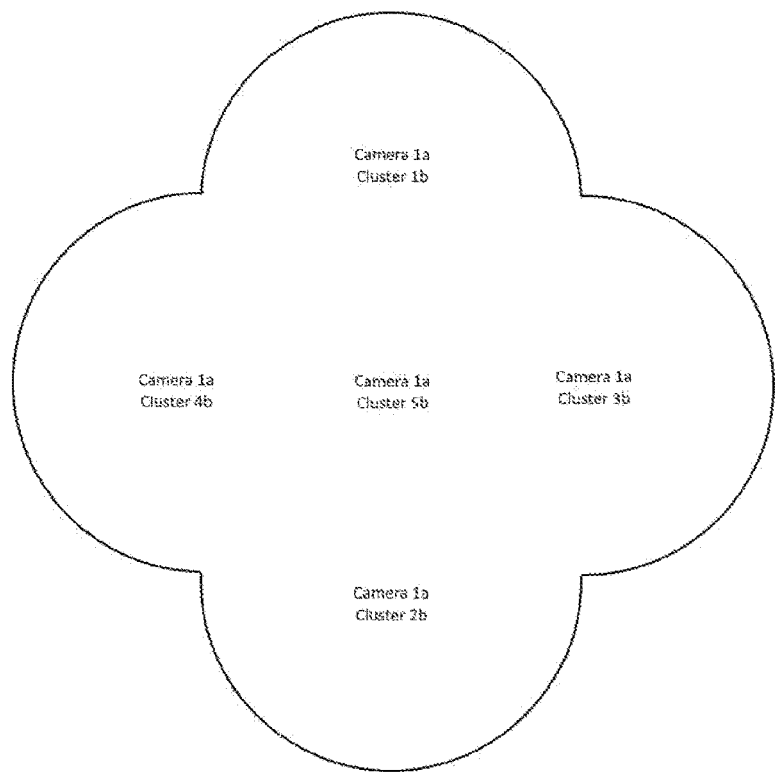
FIG. 32 is a schematic showing the relative positions of footage captured by the parallel views of the cameras in FIG. 24.
Figure 33:
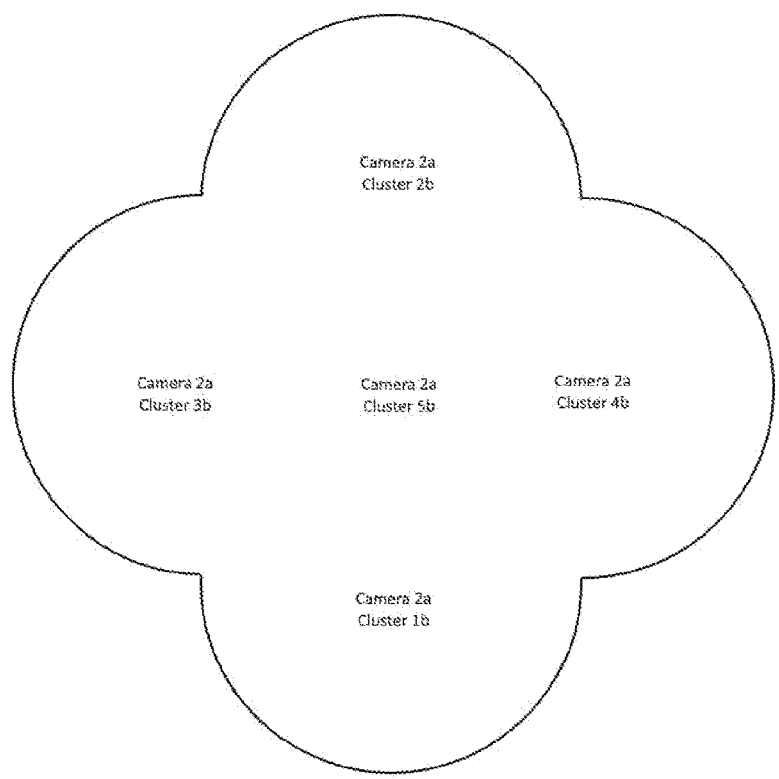
FIG. 33 is a schematic showing the relative positions of footage captured by the parallel views of the cameras in FIG. 24.
Figure 34:
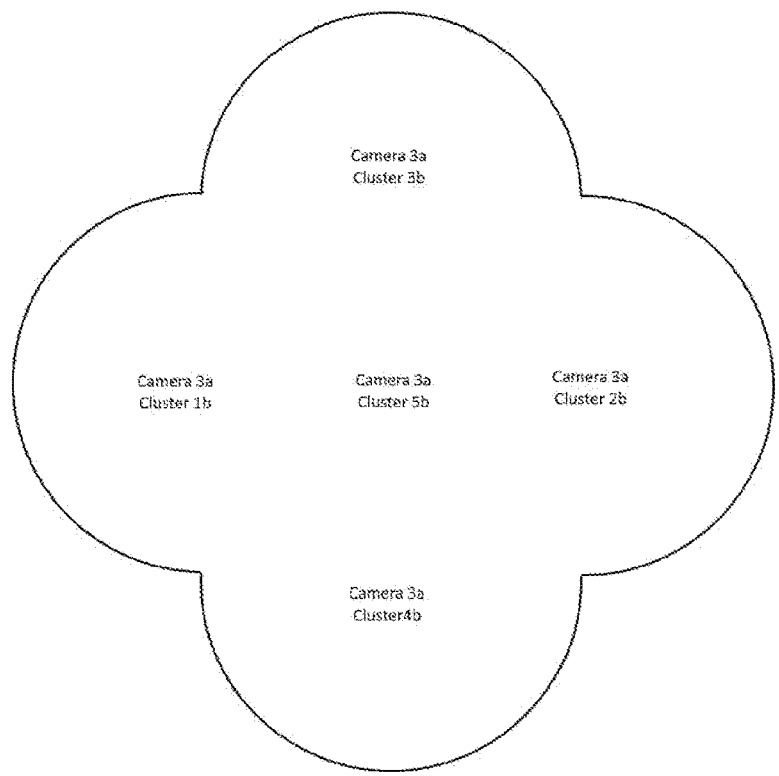
FIG. 34 is a schematic showing the relative positions of footage captured by the parallel views of the cameras in FIG. 24.
Figure 35:
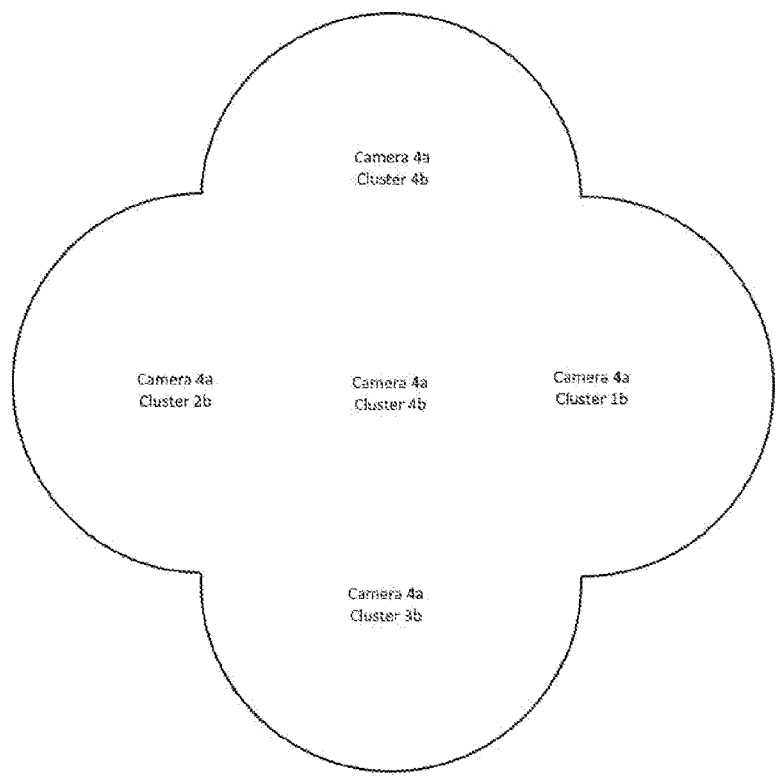
FIG. 35 is a schematic showing the relative positions of footage captured by the parallel views of the cameras in FIG. 24.

As shown in FIG. 31, the camera array system may feature a modified version of the two camera cluster of the type shown in FIG. 22. This configuration provides for the same parallel view engagements amongst the cameras, but does not enable intersecting directions between clusters.

Figure 37:
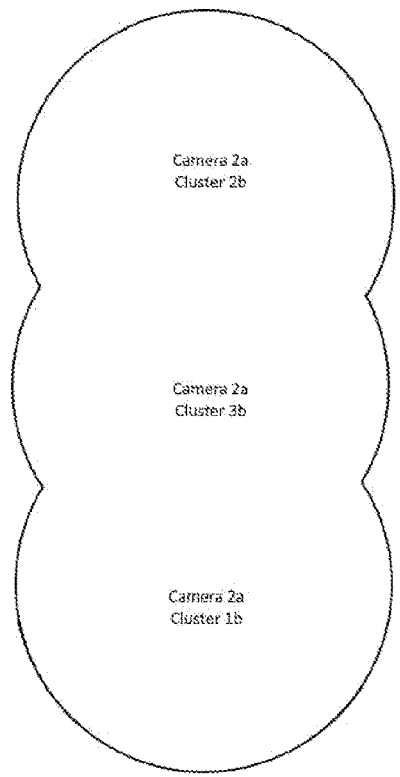
FIG. 37 is a schematic showing the relative positions of footage captured by the parallel views of the cameras in FIG. 25.
Figure 36:
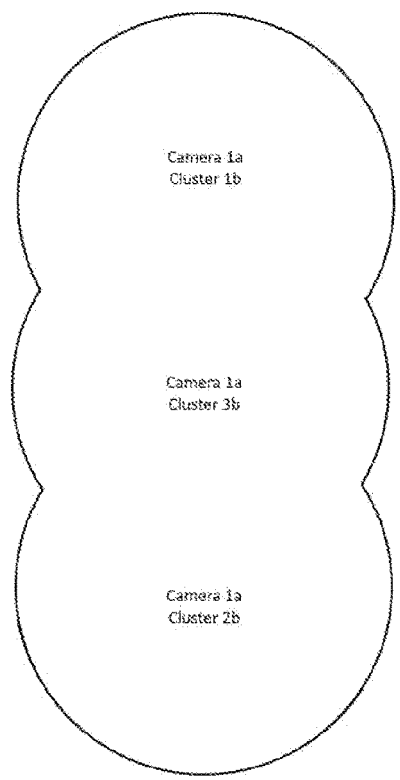
FIG. 36 is a schematic showing the relative positions of footage captured by the parallel views of the cameras in FIG. 25.
Figure 38:
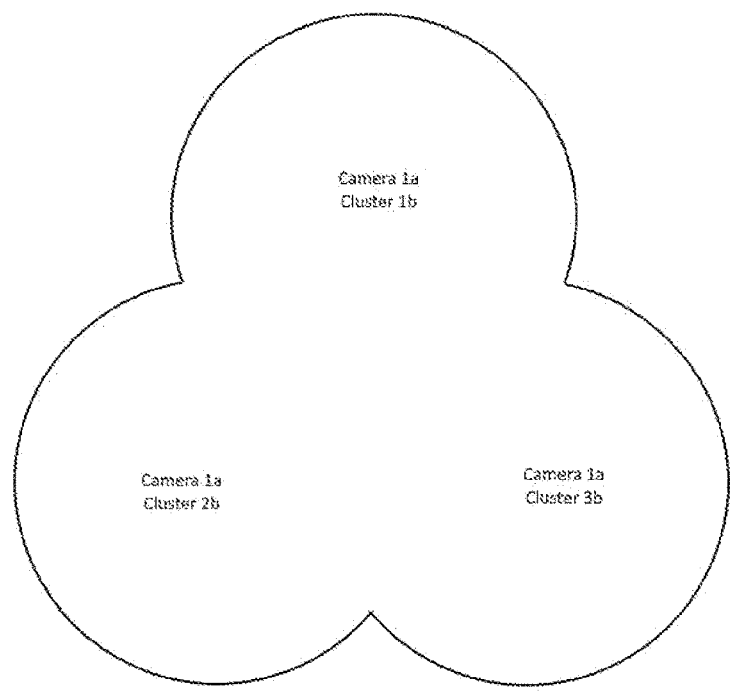
FIG. 38 is a schematic showing the relative positions of footage captured by the parallel views of the cameras in FIG. 23.
Figure 39:
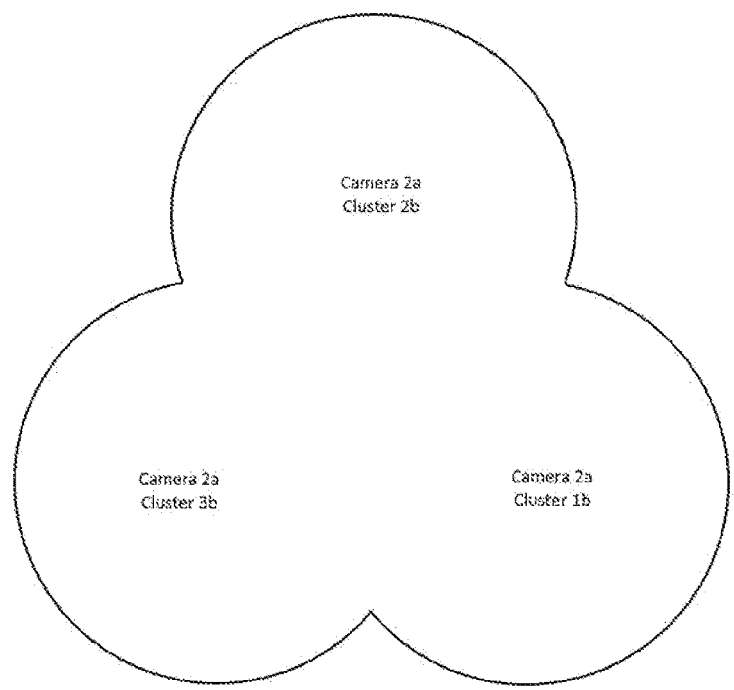
FIG. 39 is a schematic showing the relative positions of footage captured by the parallel views of the cameras in FIG. 23.
Figure 40:
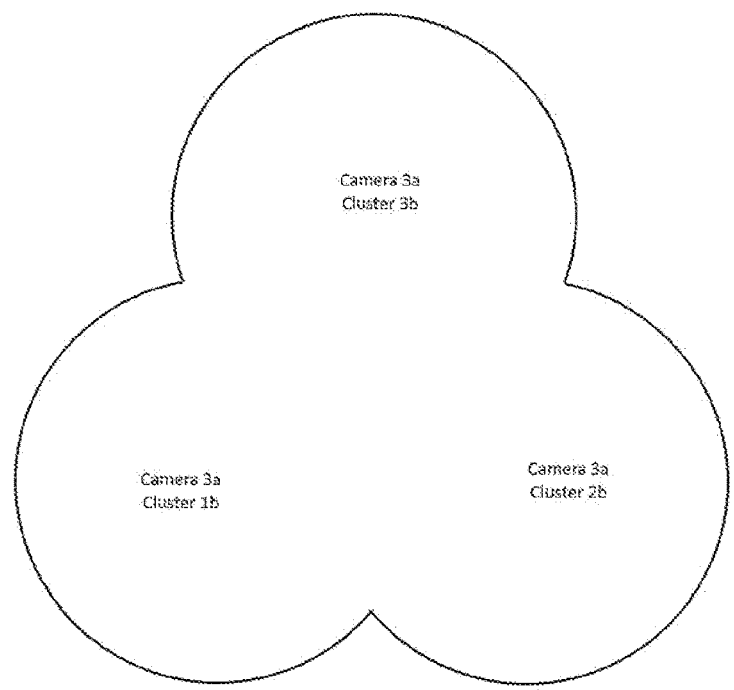
FIG. 40 is a schematic showing the relative positions of footage captured by the parallel views of the cameras in FIG. 23.

FIGS. 32-35 show the relative positions of the footage captured by the parallel views in FIG. 24. FIGS. 36-37 show the relative positions of the footage captured by the parallel views in FIG. 25. FIGS. 38-40 show the relative positions of the footage captured by the parallel views in FIG. 23.

Figure 41:
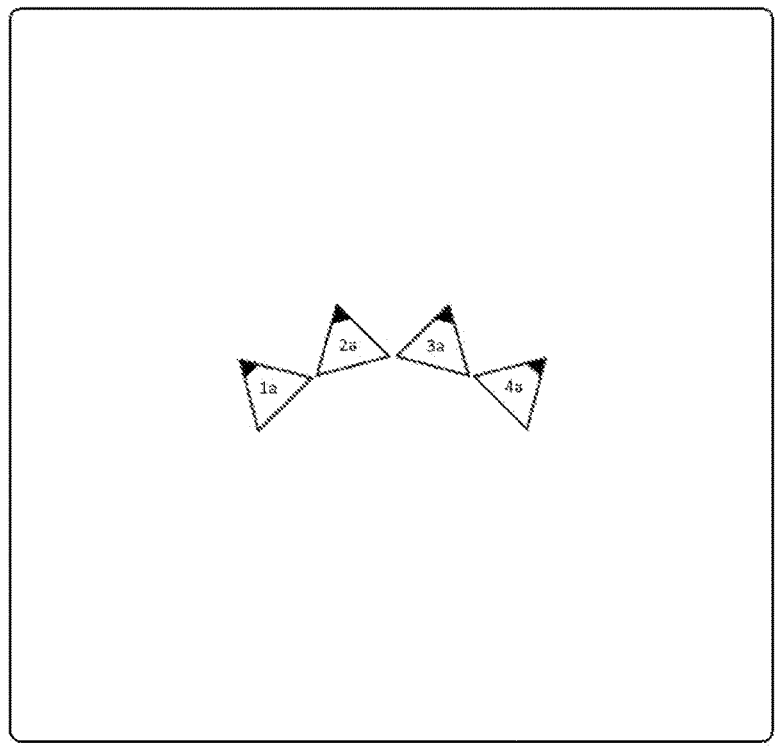
FIG. 41 is a schematic of a camera array system featuring a cluster of four upward-facing cameras.

As shown in FIG. 41, the camera array system may feature clusters of four cameras (1a, 2a, 3a, 4a) with intersecting forward directions. The cameras are spaced approximately equidistantly around a center point without fully surrounding the point. Here, each camera is positioned between 0 and 60 degrees from its neighboring camera.

Figure 42:
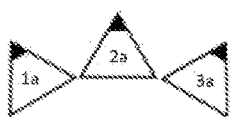
FIG. 42 is a schematic of a camera array system featuring a cluster of three upward-facing cameras.

As shown in FIG. 42, the camera array system may feature clusters of two cameras (1a and 2a) with intersecting forward directions. The cameras are spaced approximately equidistantly around a center point without fully surrounding the point. Here, each camera is positioned between 0 and 180 degrees from its neighboring camera.

Figure 43:
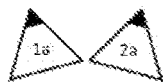
FIG. 43 is a schematic of a camera array system featuring a cluster of two upward-facing cameras.

As shown in FIG. 43, the camera array system may feature clusters of three cameras (1a, 2a, and 3a) with intersecting forward directions. The cameras are spaced approximately equidistantly around a center point without fully surrounding the point. Here, each camera is positioned between 0 and 90 degrees from its neighboring camera.

Figure 44:
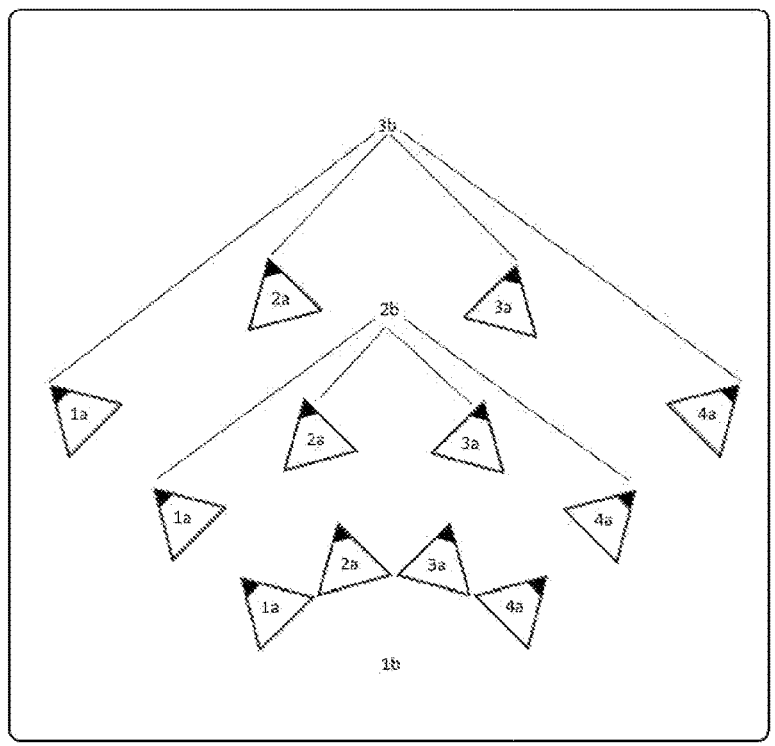
FIG. 44 is a schematic of a camera array system featuring three tiers of upward-facing cameras.

As shown in FIG. 44, the camera array system may two or more clusters of cameras, with each cluster having the same positioning with respect to its neighboring camera around the center point. However, the clusters here are arranged in tiers, with each additional tier being placed behind the preceding tier. Consequently, there is greater distance between each camera within a cluster in each succeeding tier. In one variation, cameras 1a, cameras 2a, cameras 3a, and cameras 4a have first, second, third, and fourth parallel views across clusters such that, for example, camera 1a in cluster 1b, camera 1a in cluster 2b, and camera 1a in cluster 3b have parallel views. In this variation, the cameras of all clusters have a common upward angle above the plate. In another variation, however, cameras within a cluster may have a common upward angle above the plate, but different angles may arise across clusters. Thus, cameras 1*a*, cameras 3*a*, cameras 3*a*, and cameras 4*a* across all clusters may have a common point of intersection. This is possible if clusters in succeeding tiers have lower upward angles above the plate than clusters in preceding tiers. For example, the cameras in cluster 1*b* may have an upward angle of 75 degrees while cameras in cluster 2*b*, which are positioned behind the cameras in cluster 1*b*, may have an upward angle of 60 degrees, and cameras in cluster 3*b* may have an upward angle of 45 degrees.

Figure 45:
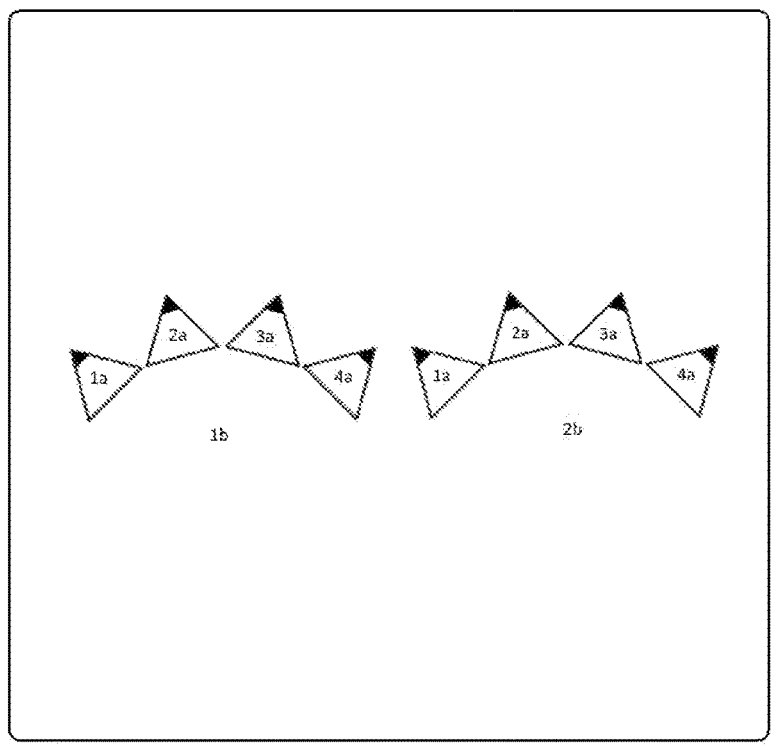
FIG. 45 is a schematic of a camera array system featuring two clusters of four upward-facing cameras.

As shown in FIG. 45, the camera array system may have two or more clusters of cameras, with each cluster having the same positioning with respect to its neighboring camera around their center points as well as each camera within a cluster being equidistant from its neighbor. This is possible if each cluster has its own center. Thus, the clusters may be placed side by side. Parallel directions occur amongst, first, cameras 1*a* of each cluster, second, cameras 2*a* of each cluster, third, cameras 3*a* of each cluster, and fourth cameras 4*a* of each cluster.

Figure 46:
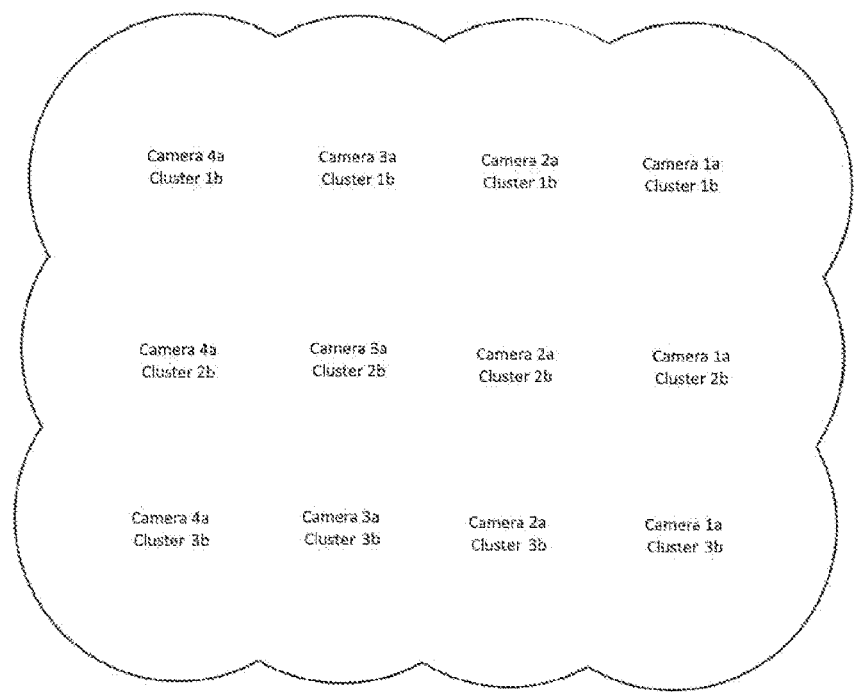
FIG. 46 is a schematic showing the relative positions of footage captured by the parallel views of the cameras in FIG. 44.

FIG. 46 shows the relative position of the footage captured by the views in FIG. 44.

Figure 47:
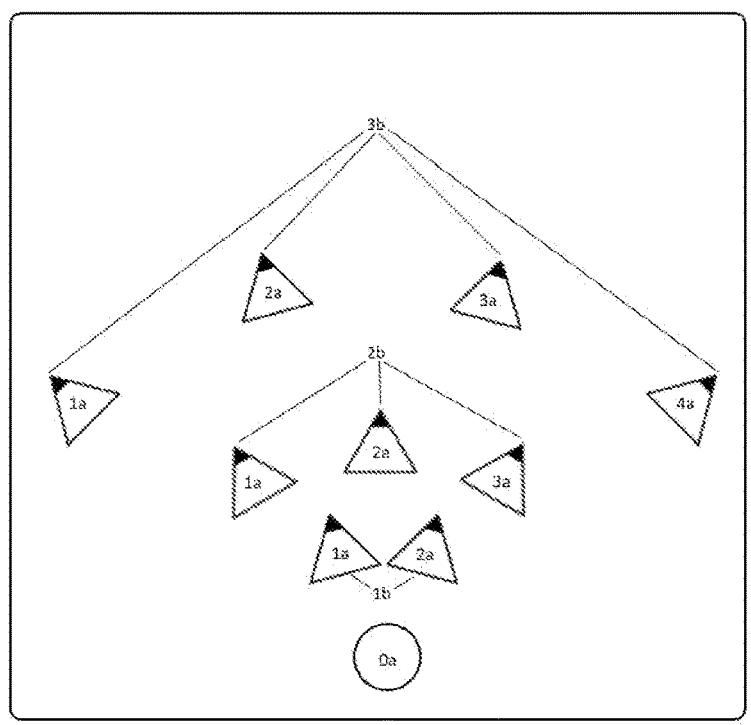
FIG. 47 is a schematic of a camera array system featuring three tiers of upward-facing cameras.

FIG. 47 is similar to FIG. 44, except that the number of cameras changes per clusters. In a preferred embodiment, each succeeding tier contains more cameras than the preceding tier. At the center may be a "zero tier" cluster (0*a*) of a single camera. In one variation, this single camera is directed 90 degrees from the plate.

Figure 48:
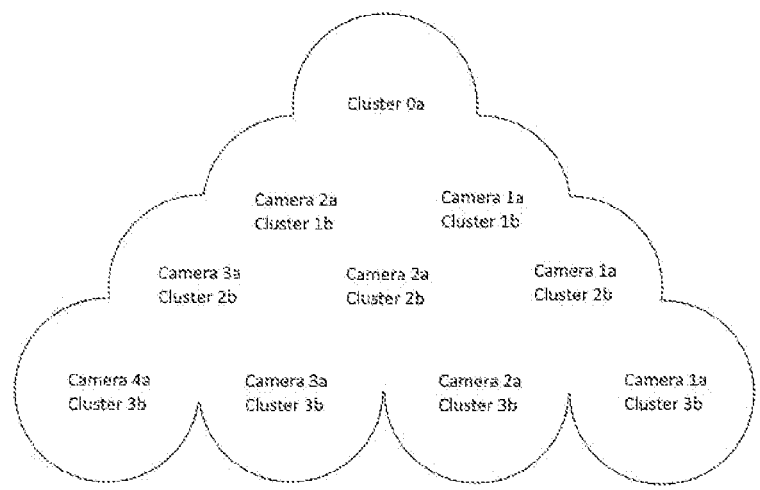
FIG. 48 is a schematic showing the relative positions of footage captured by the parallel views of the cameras in FIG. 47.

FIG. 48 shows the relative position of the footage captured by the views in FIG. 47.

Figure 49:
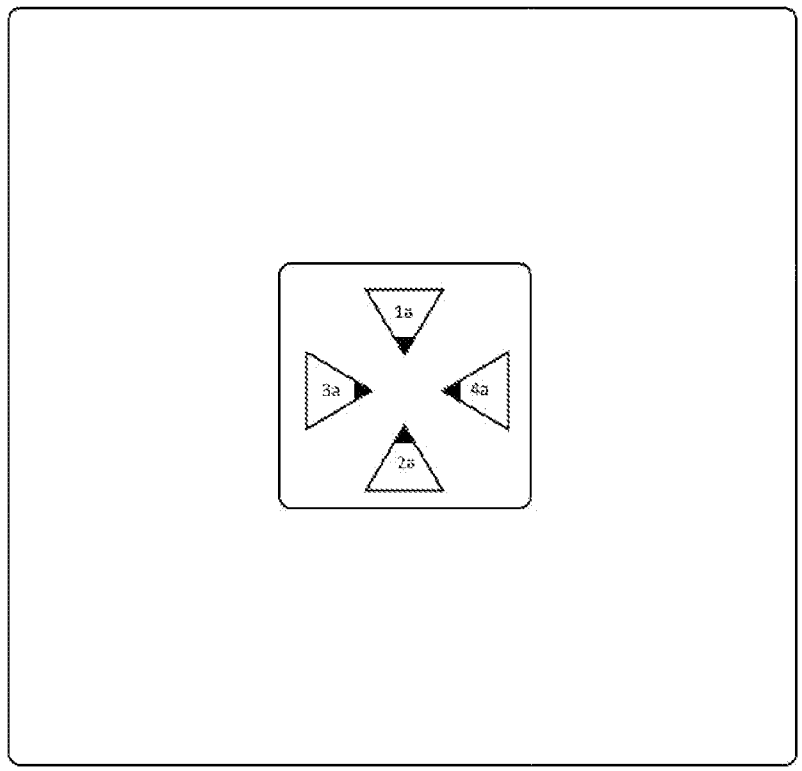
FIG. 49 is a schematic of a camera array system featuring a cluster of four cameras.

FIG. 49 is similar to FIG. 18, showing a camera array system featuring a cluster of four upward facing cameras (1*a*, 2*a*, 3*a*, and 4*a*), however the upward facing cameras are not targeting a common point in space. Although they are all facing upwards, they are facing away from each other in the horizontal plane. Crucially, however, the backwards directions of the cameras have a common point of intersection. This common point of intersection will be behind the cameras at a distance corresponding to the distance between the cameras. The cameras may be spaced approximately equidistantly around a center point, such that a first camera is disposed at approximately 0 degrees, a second at approximately 90 degrees, a third at 180 degrees, and a fourth at 270 degrees. The center between the cameras may align with the central axis of the car and therefore substantially in line with the direction of the moving vehicle. In one variation, the center is to the left of the central axis of the car. In another variation, the center is to the right of the central axis.

Figure 50:
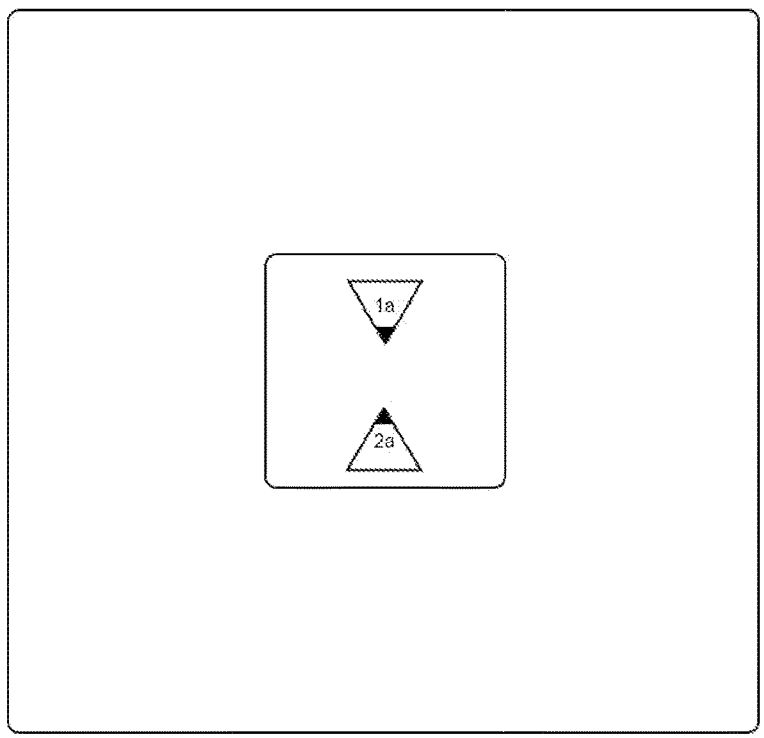
FIG. 50 is a schematic of a camera array system featuring a cluster of two upward-facing cameras.

FIG. 50 is similar to FIG. 19 in terms of positioning, however similar to the changes between FIG. 18 and FIG. 49, the upward facing cameras are not targeting a common point in space and do not have intersecting forward directions, but instead share a common point of intersection in their backwards directions.

Figure 51:
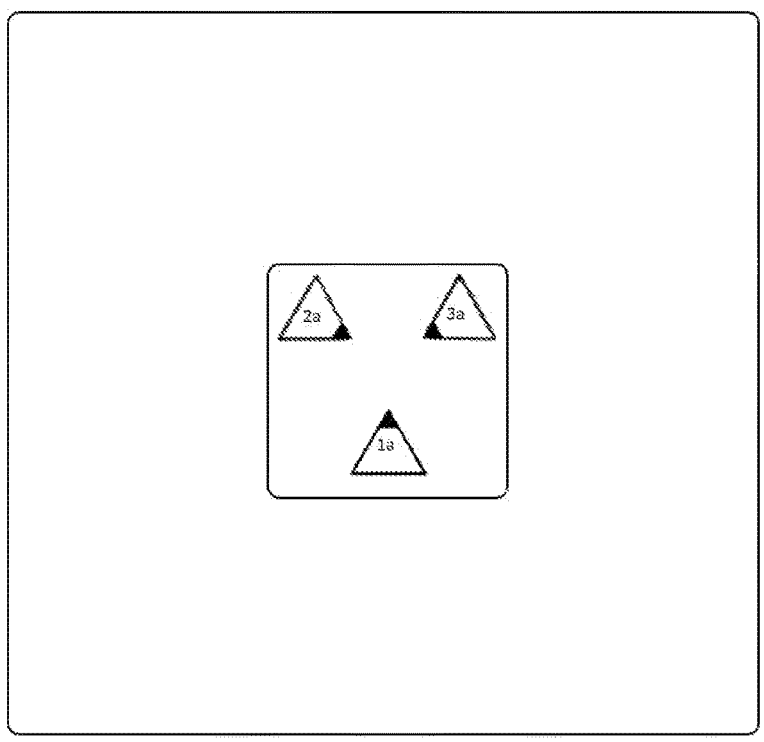
FIG. 51 is a schematic of a camera array system featuring a cluster of three upward-facing cameras.

FIG. 51 is similar to FIG. 20 in terms of positioning, however similar to the changes between FIG. 18 and FIG. 49, the upward facing cameras are not targeting a common point in space and do not have intersecting forward directions, but instead share a common point of intersection in their backwards directions.

Figure 52:
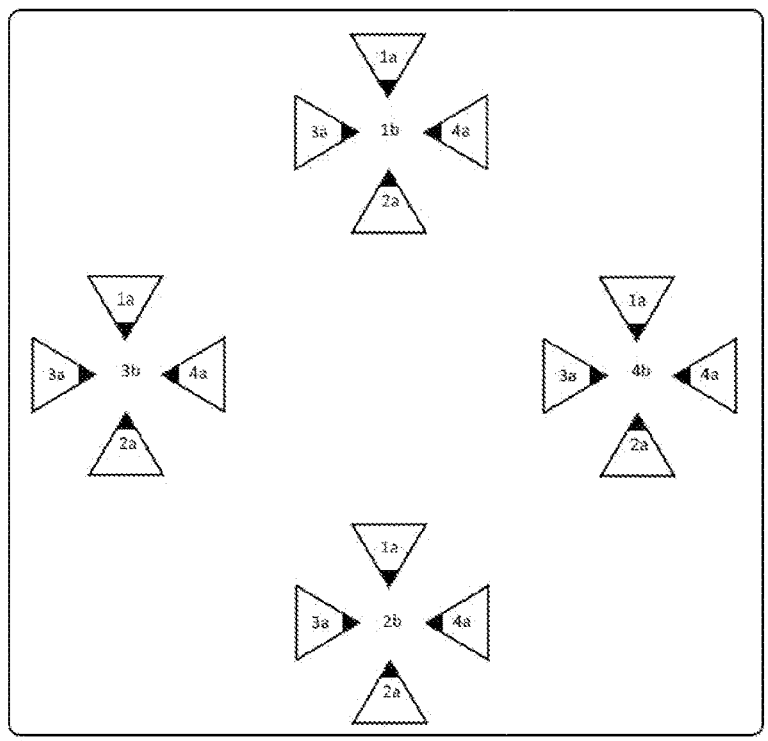
FIG. 52 is a schematic of a camera array system featuring four clusters of four upward-facing cameras.

FIG. 52 is similar to FIG. 21 in terms of positioning and parallel directions, however similar to the changes between FIG. 18 and FIG. 49, the upward facing cameras are not targeting a common point in space and do not have intersecting forward directions, but instead share a common point of intersection in their backwards directions. Intersecting backward directions occur between, first, camera 1*a* of cluster 1*b* and camera 2*a* of cluster 2*b*, and second, camera 3*a* of cluster 3*b* and camera 4*a* of cluster 4*b*. Parallel directions occur amongst, first, cameras 1*a* of each cluster, second, cameras 2*a* of each cluster, third, cameras 3*a* of each cluster, and fourth cameras 4*a* of each cluster. The combination of intersecting backward directions and parallel directions enable superior stitching of footage. In general and throughout, cameras must have the same angle upward from the plate in order for parallel directions to be possible.

Figure 53:
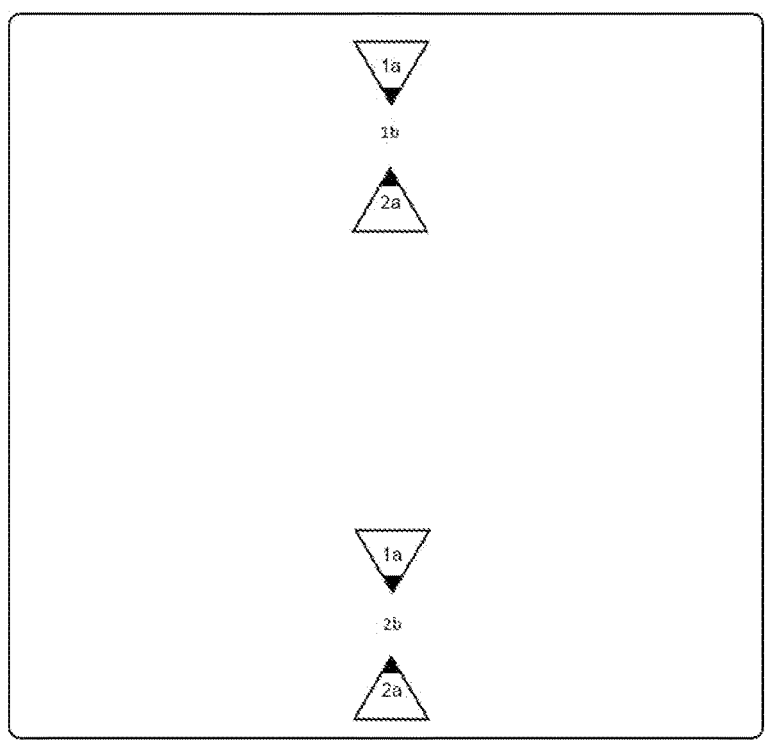
FIG. 53 is a schematic of a camera array system featuring two clusters of two upward-facing cameras.

FIG. 53 is similar to FIG. 22 in terms of positioning and parallel directions, however similar to the changes between FIG. 18 and FIG. 49, the upward facing cameras are not targeting a common point in space and do not have intersecting forward directions, but instead share a common point of intersection in their backwards directions. Intersecting backward directions occur between camera 1*a* of cluster 1*b* and camera 2*a* of cluster 2*b*. Parallel directions occur amongst, first, camera 1*a* of cluster 1*b* and camera 1*a* of cluster 2*b*, and second, camera 2*a* of cluster 1*b* and camera 2*a* of cluster 2*b*.

Figure 54:
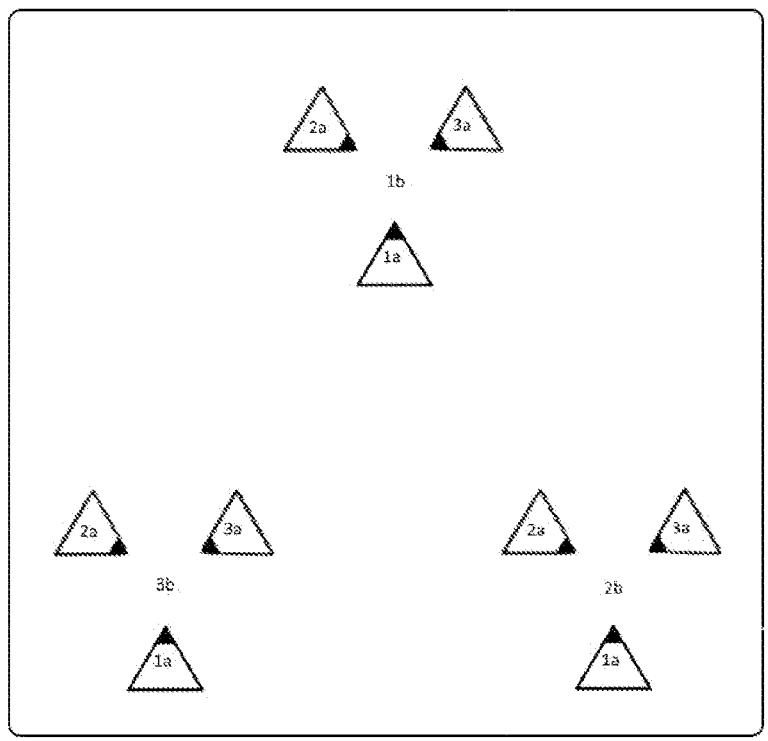
FIG. 54 is a schematic of a camera array system featuring three clusters of three upward-facing cameras.

FIG. 54 is similar to FIG. 23 in terms of positioning and parallel directions, however similar to the changes between FIG. 18 and FIG. 49, the upward facing cameras are not targeting a common point in space and do not have intersecting forward directions, but instead share a common point of intersection in their backwards directions. Intersecting backward directions occur between each of the cameras within each cluster. Parallel directions occur amongst, first, cameras 1*a* of each cluster, second, cameras 2*a* of each cluster, and third, cameras 3*a* of each cluster.

Figure 55:
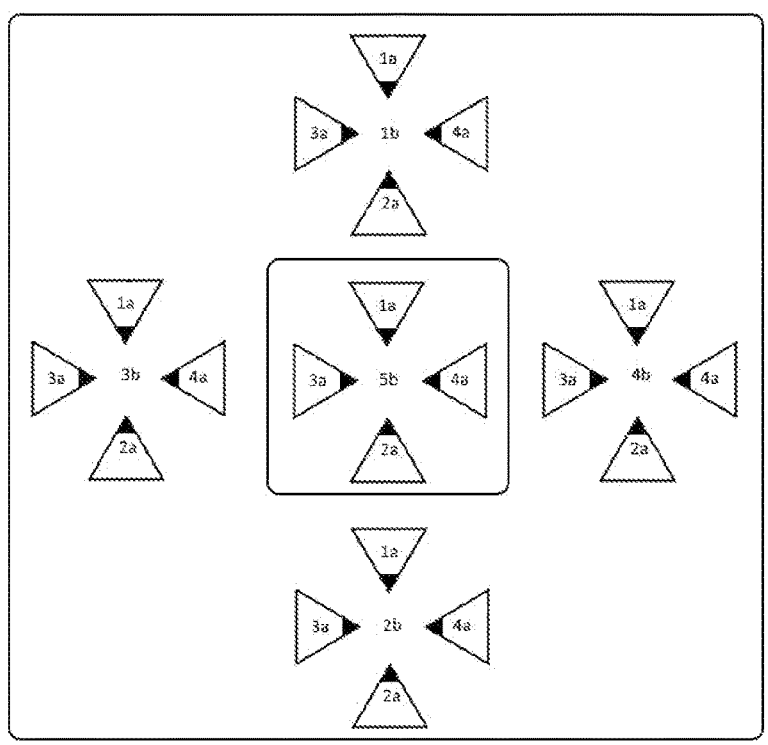
FIG. 55 is a schematic of a camera array system featuring five clusters of four upward-facing cameras.

FIG. 55 is similar to FIG. 24 in terms of positioning and parallel directions, however similar to the changes between FIG. 18 and FIG. 49, the upward facing cameras are not targeting a common point in space and do not have intersecting forward directions, but instead share a common point of intersection in their backwards directions. The camera array system is like the camera array system of FIG. 52 but features an additional fifth cluster (5*b*). Amongst the cameras of cluster 5*b*, camera 1*a* can be included in the first parallel direction referenced for FIG. 52, camera 2*a* can be included in the second parallel direction, camera 3*a* can be included in the third parallel direction, and camera 4*a* can be included in the fourth parallel direction. Additional intersecting backward directions may occur between cameras 1*a*, 2*a*, 3*a*, and 4*a* of cluster 5*b* with, respectively, camera 2*a* of cluster 2*b*, camera 1*a* of cluster 1*b*, camera 4*a* of cluster 4*b*, and camera 3*a* of cluster 3*b*.

Figure 56:
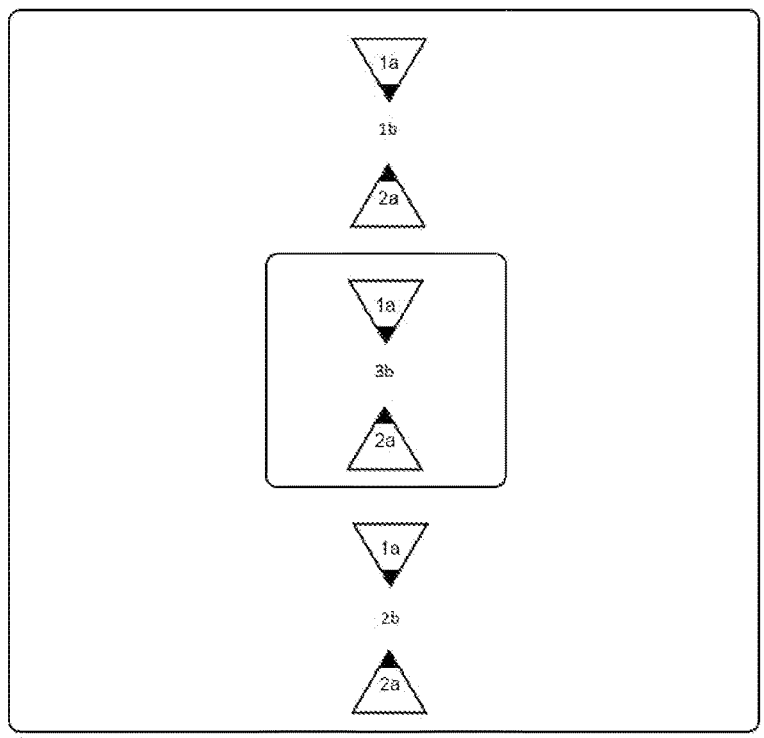
FIG. 56 is a schematic of a camera array system featuring three clusters of two upward-facing cameras.

FIG. 56 is similar to FIG. 25 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature the two clusters of the type shown in FIG. 53, with an additional third cluster (3*b*) disposed between the two clusters. Amongst the cameras of cluster 3*b*, camera 1*a* can be included in the first parallel direction and camera 2*a* can be included in the second parallel direction. Additional intersecting backward directions may occur between cameras 1*a* and 2*a* of cluster 3*b* with, respectively, camera 2*a* of cluster 2*b* and camera 1*a* of cluster 1*b*.

Figure 57:
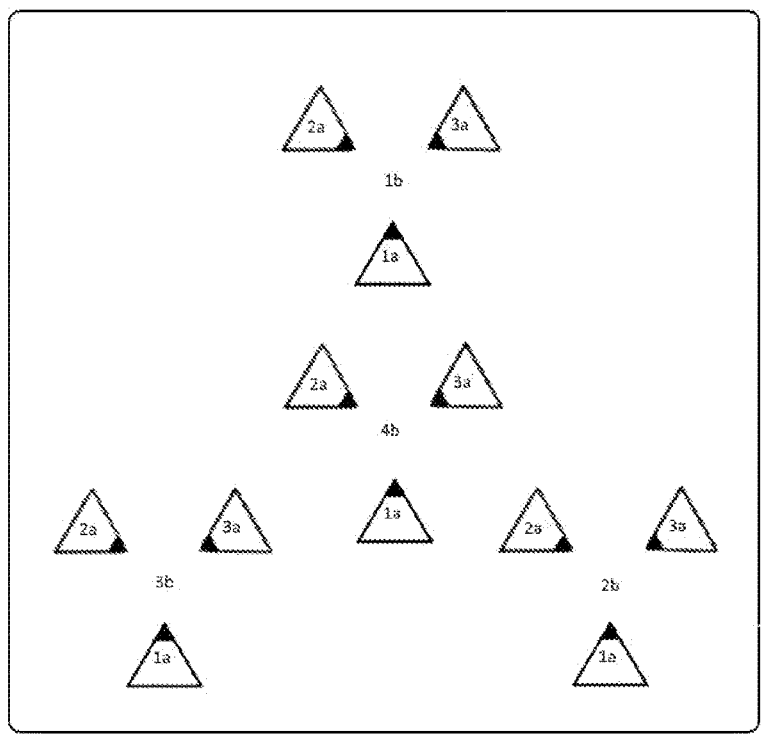
FIG. 57 is a schematic of a camera array system featuring four clusters of three upward-facing cameras.

FIG. 57 is similar to FIG. 26 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature the three clusters of the type shown in FIG. 54, with an additional fourth cluster (4b) disposed in the approximate center of the three clusters. Parallel directions include, first, the 1a cameras of each cluster, second the 2a cameras of each cluster, and third, the 3a cameras of each cluster. All of the cameras in the 4b cluster have intersecting backward directions.

Figure 58:
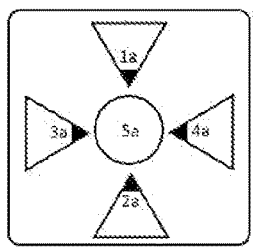
FIG. 58 is a schematic of a camera array system featuring a cluster of five upward-facing cameras.

FIG. 58 is similar to FIG. 27 in terms of positioning, however similar to the changes between FIG. 18 and FIG. 49, the upward facing cameras are not targeting a common point in space and do not have intersecting forward directions, but instead share a common point of intersection in their backwards directions. This camera array system may feature the four cameras of the type shown in FIG. 49, with an additional camera 5a. Camera 5a is angled approximately 90 degrees from the plate, and therefore its backward direction intersects those of cameras 1a, 2a, 3a, and 4a.

Figure 59:
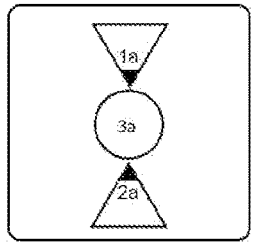
FIG. 59 is a schematic of a camera array system featuring a cluster of three upward-facing cameras.

FIG. 59 is similar to FIG. 28 in terms of positioning, however similar to the changes between FIG. 18 and FIG. 49, the upward facing cameras are not targeting a common point in space and do not have intersecting forward directions, but instead share a common point of intersection in their backwards directions. This camera array system may feature the two camera cluster of the type shown in FIG. 50, with an additional camera 3a. Camera 3a is angled approximately 90 degrees from the plate, and therefore its backward direction intersects those of cameras 1a and 2a.

Figure 60:
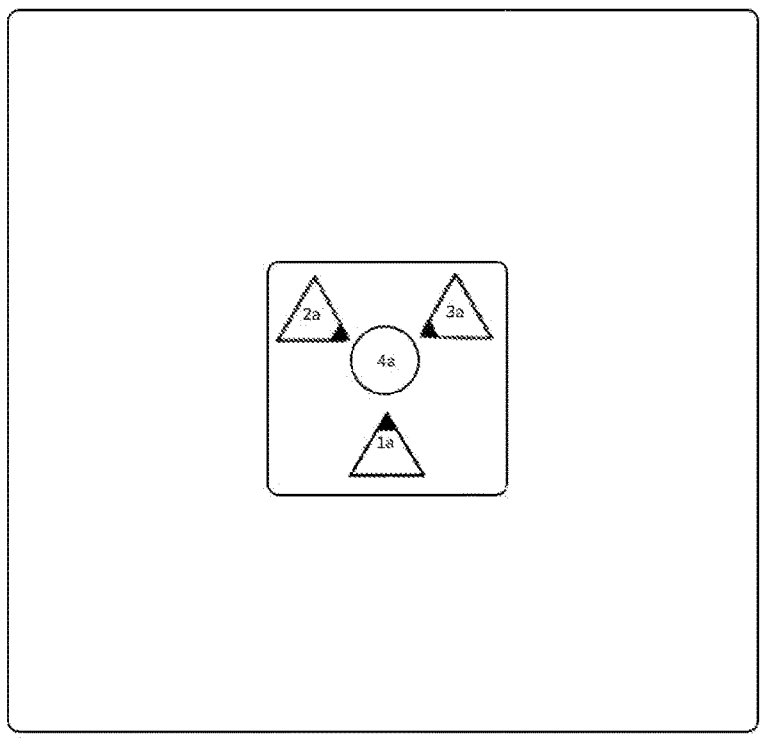
FIG. 60 is a schematic of a camera array system featuring cluster of four upward-facing cameras.

FIG. 60 is similar to FIG. 29 in terms of positioning, however similar to the changes between FIG. 18 and FIG. 49, the upward facing cameras are not targeting a common point in space and do not have intersecting forward directions, but instead share a common point of intersection in their backwards directions. This camera array system may feature the three camera cluster of the type shown in FIG. 51, with an additional camera 4a. Camera 4a is angled approximately 90 degrees from the plate, and therefore its backward direction intersects those of cameras 1a, 2a, and 3a.

Figure 61:
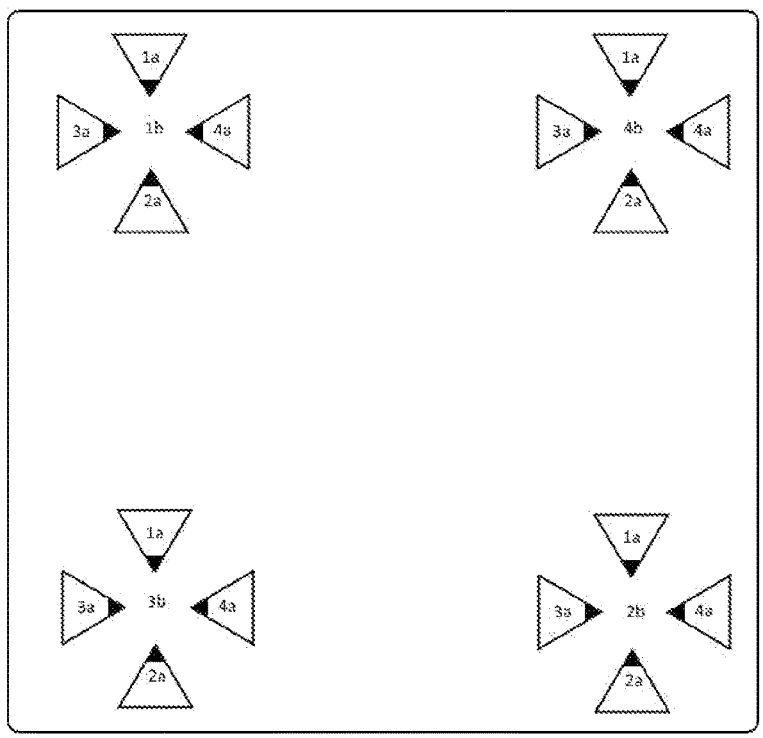
FIG. 61 is a schematic of a camera array system featuring four clusters of four upward-facing cameras.

FIG. 61 is similar to FIG. 30 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature a modified version of the four camera cluster of the type shown in FIG. 52. This configuration provides for the same parallel view engagements amongst the cameras; however, the intersecting backward directions are different: first, camera 1a of cluster 1b with camera 2a of cluster 3b, second, camera 1a of cluster 4b with camera 2a of cluster 2b, third, camera 3a of cluster 1b with camera 4a of cluster 4b, and fourth, camera 3a of cluster 3b with camera 4a of cluster 2b.

Figure 62:
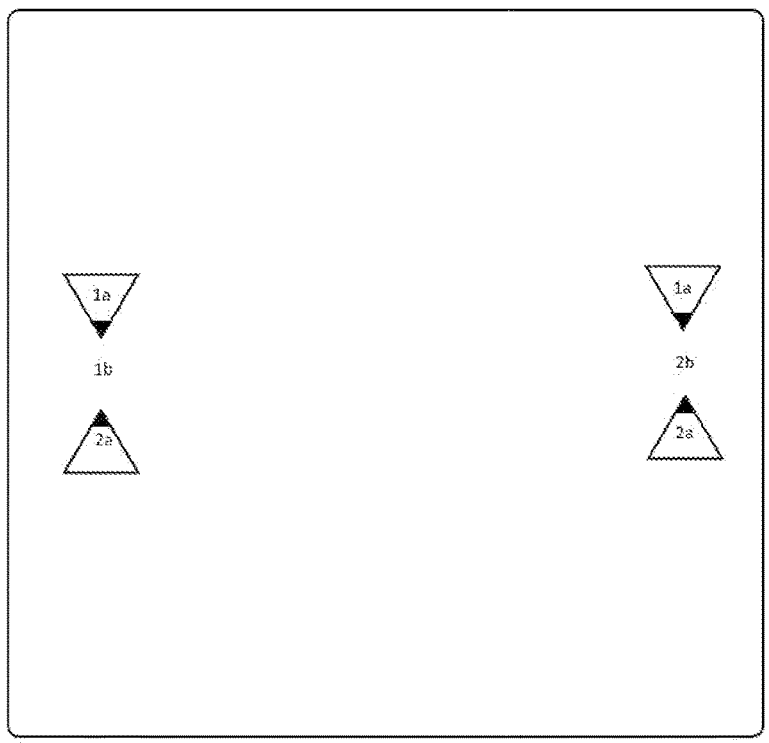
FIG. 62 is a schematic of a camera array system featuring two clusters of two upward-facing cameras.
Figure 63:
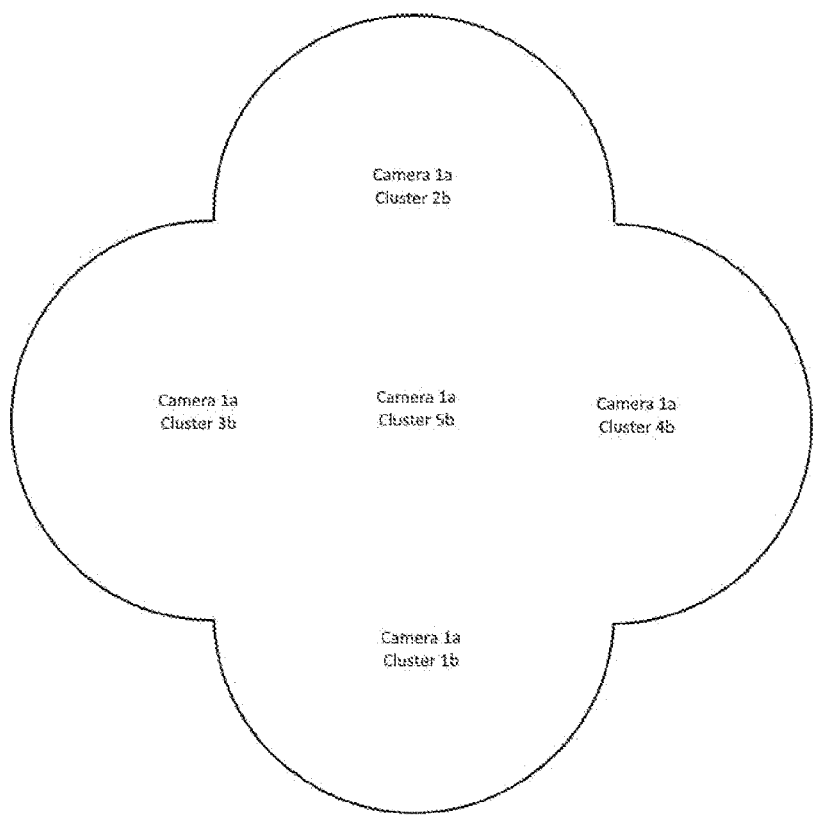
FIG. 63 is a schematic showing the relative positions of footage captured by the parallel views of the cameras in FIG. 55.
Figure 64:
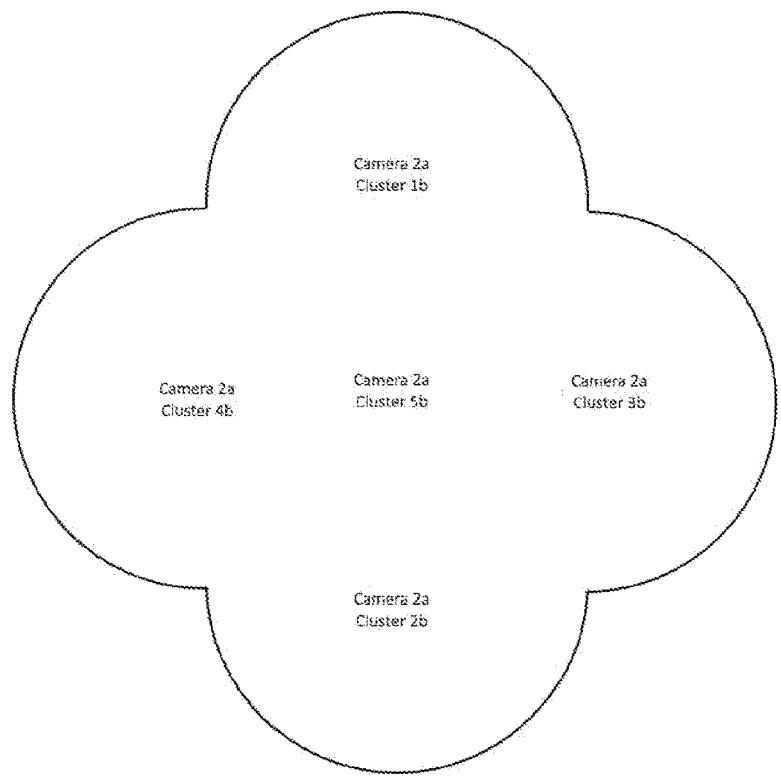
FIG. 64 is a schematic showing the relative positions of footage captured by the parallel views of the cameras in FIG. 55.
Figure 65:
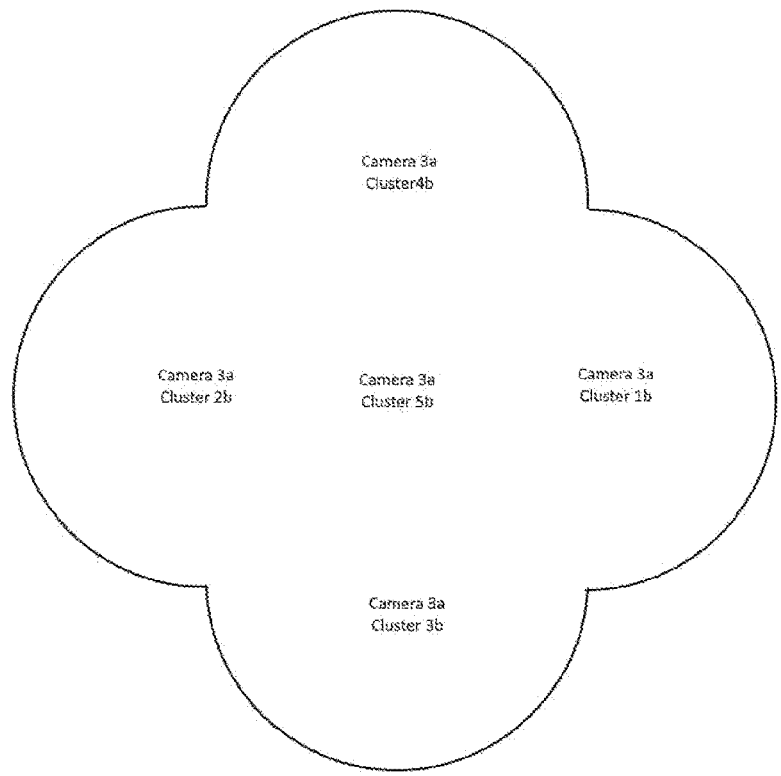
FIG. 65 is a schematic showing the relative positions of footage captured by the parallel views of the cameras in FIG. 55.
Figure 66:
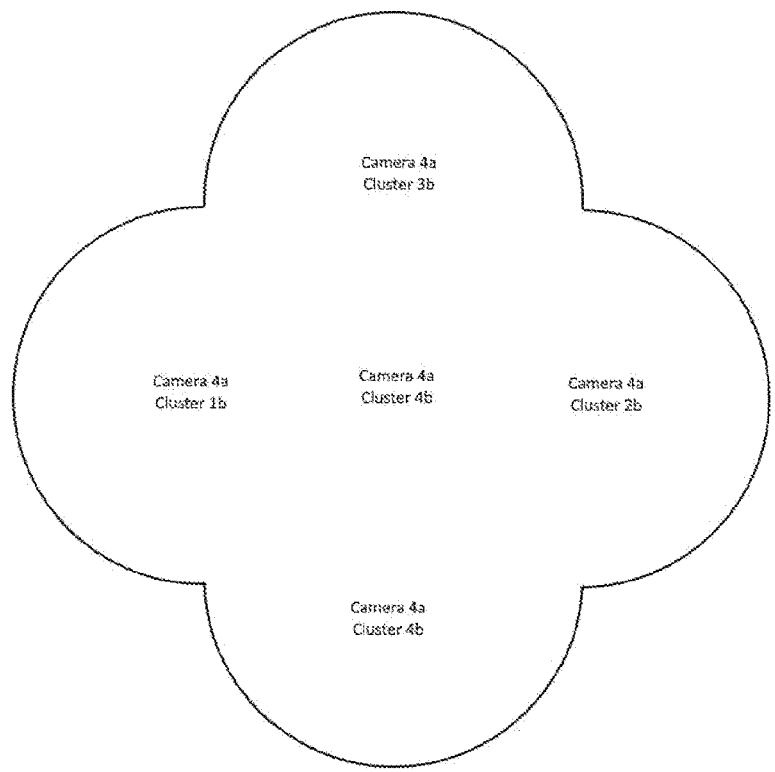
FIG. 66 is a schematic showing the relative positions of footage captured by the parallel views of the cameras in FIG. 55.

FIG. 62 is similar to FIG. 31 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature a modified version of the two camera cluster of the type shown in FIG. 53. This configuration provides for the same parallel view engagements amongst the cameras, but does not enable intersecting directions between clusters.

Figure 67:
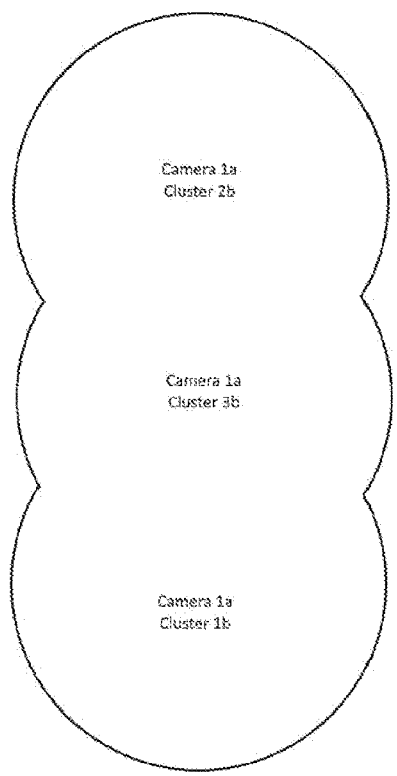
FIG. 67 is a schematic showing the relative positions of footage captured by the parallel views of the cameras in FIG. 56.
Figure 68:
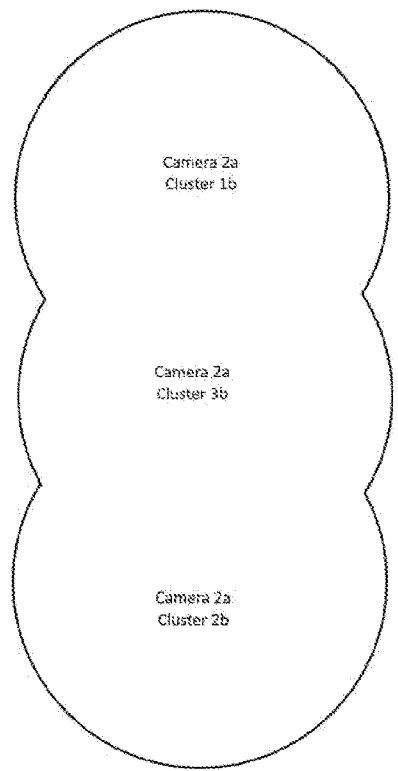
FIG. 68 is a schematic showing the relative positions of footage captured by the parallel views of the cameras in FIG. 56.

FIGS. 63-66 show the relative positions of the footage captured by the parallel views in FIG. 55. FIGS. 67-68 show the relative positions of the footage captured by the parallel views in FIG. 56. The relative positions of the footage captured by the parallel views in FIG. 54 are the same as those in FIG. 23, as shown in FIGS. 38-40.

Figure 69:
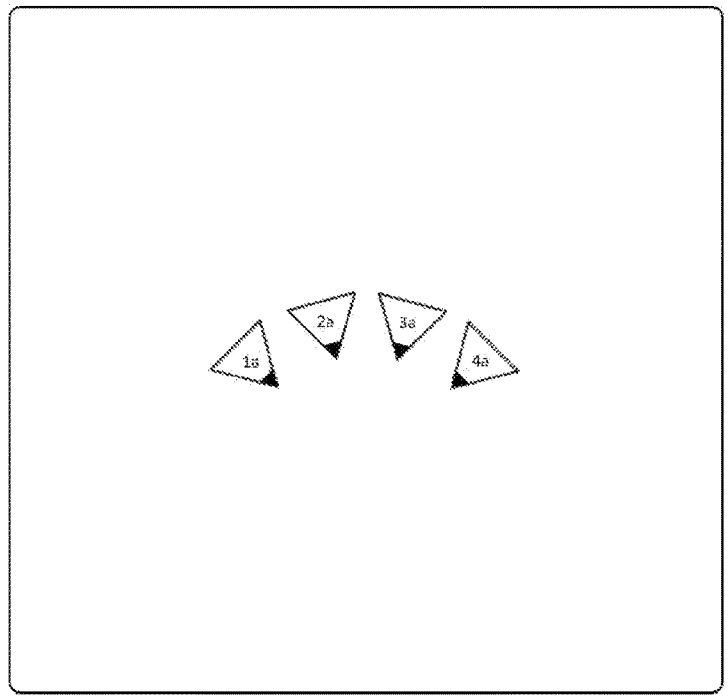
FIG. 69 is a schematic of a camera array system featuring a cluster of four upward-facing cameras.

FIG. 69 is similar to FIG. 41 in terms of positioning and parallel directions, however similar to the changes between FIG. 18 and FIG. 49, the upward facing cameras are not targeting a common point in space and do not have intersecting forward directions, but instead share a common point of intersection in their backwards directions. The cameras are spaced approximately equidistantly around a center point without fully surrounding the point. Here, each camera is positioned between 0 and 60 degrees from its neighboring camera.

Figure 70:
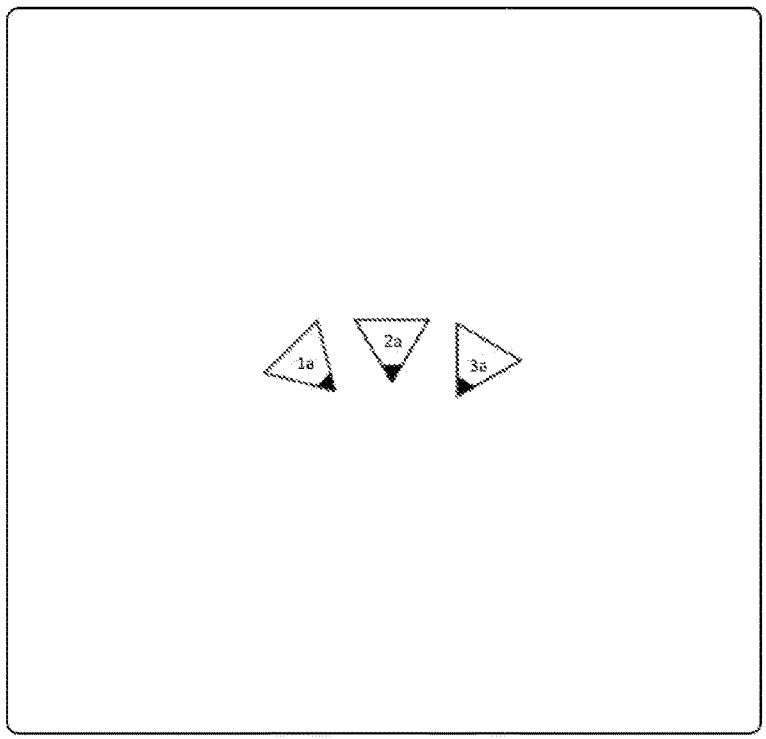
FIG. 70 is a schematic of a camera array system featuring a cluster of three upward-facing cameras.

FIG. 70 is similar to FIG. 42 in terms of positioning and parallel directions, however similar to the changes between FIG. 18 and FIG. 49, the upward facing cameras are not targeting a common point in space and do not have intersecting forward directions, but instead share a common point of intersection in their backwards directions. The cameras are spaced approximately equidistantly around a center point without fully surrounding the point. Here, each camera is positioned between 0 and 180 degrees from its neighboring camera.

Figure 71:
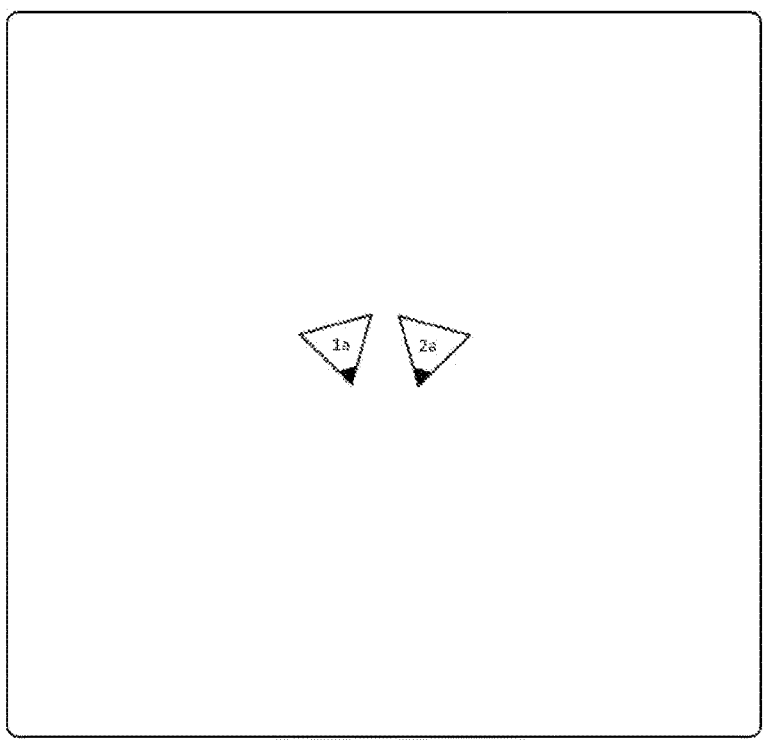
FIG. 71 is a schematic of a camera array system featuring a cluster of two upward-facing cameras.

FIG. 71 is similar to FIG. 43 in terms of positioning and parallel directions, however similar to the changes between FIG. 18 and FIG. 49, the upward facing cameras are not targeting a common point in space and do not have intersecting forward directions, but instead share a common point of intersection in their backwards directions. The cameras are spaced approximately equidistantly around a center point without fully surrounding the point. Here, each camera is positioned between 0 and 90 degrees from its neighboring camera.

Figure 72:
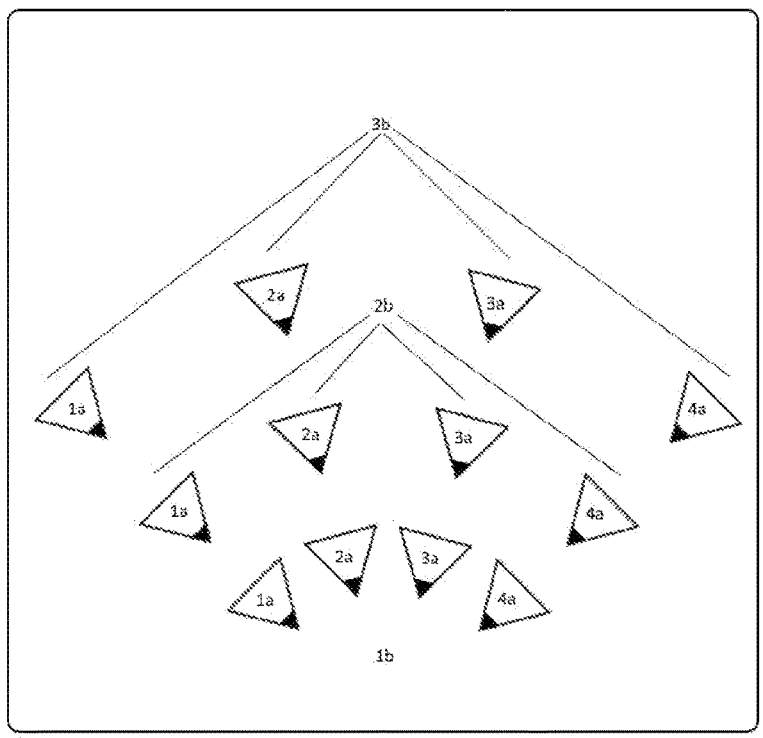
FIG. 72 is a schematic of a camera array system featuring three tiers of upward-facing cameras.

FIG. 72 is similar to FIG. 44 in terms of positioning and parallel directions, however similar to the changes between FIG. 18 and FIG. 49, the upward facing cameras are not targeting a common point in space and do not have intersecting forward directions, but instead share a common point of intersection in their backwards directions. The clusters here are arranged in tiers, with each additional tier being placed behind the preceding tier. Consequently, there is greater distance between each camera within a cluster in each succeeding tier. In one variation, cameras 1a, cameras 2a, cameras 3a, and cameras 4a have first, second, third, and fourth parallel views across clusters such that, for example, camera 1a in cluster 1b, camera 1a in cluster 2b, and camera 1a in cluster 3b have parallel views. In this variation, the cameras of all clusters have a common upward angle above the plate. In another variation, however, cameras within a cluster may have a common upward angle above the plate, but different angles may arise across clusters. All cameras may have a common point of intersection in their backwards directions. This is possible if clusters in succeeding tiers have lower upward angles above the plate than clusters in preceding tiers. For example, the cameras in cluster 1b may have an upward angle of 75 degrees while cameras in cluster 2b, which are positioned behind the cameras in cluster 1b, may have an upward angle of 60 degrees, and cameras in cluster 3b may have an upward angle of 45 degrees.

Figure 73:
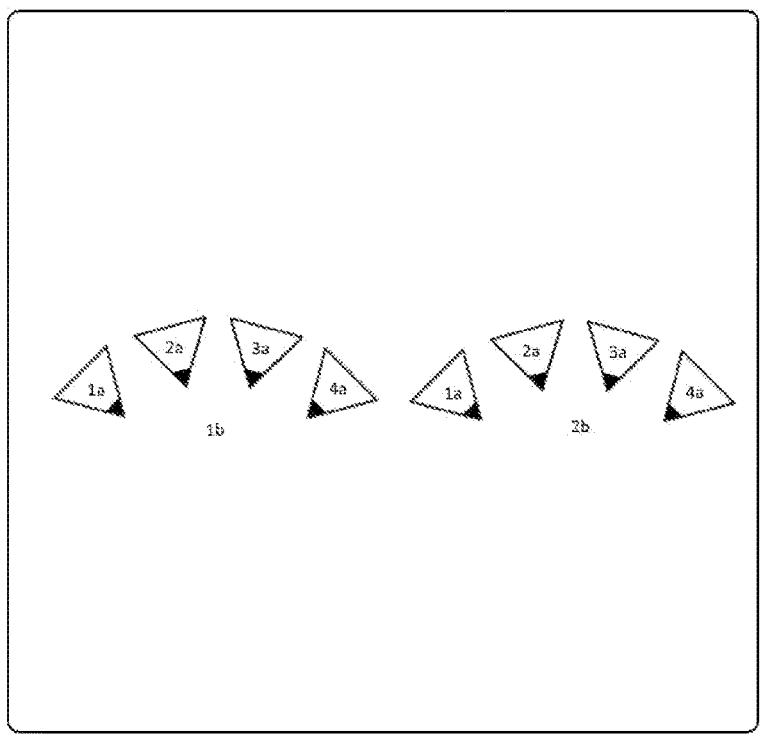
FIG. 73 is a schematic of a camera array system featuring two clusters of four upward-facing cameras.

FIG. 73 is similar to FIG. 45 in terms of positioning and parallel directions, however similar to the changes between FIG. 18 and FIG. 49, the upward facing cameras are not targeting a common point in space and do not have intersecting forward directions, but instead share a common point of intersection in their backwards directions.

Figure 74:
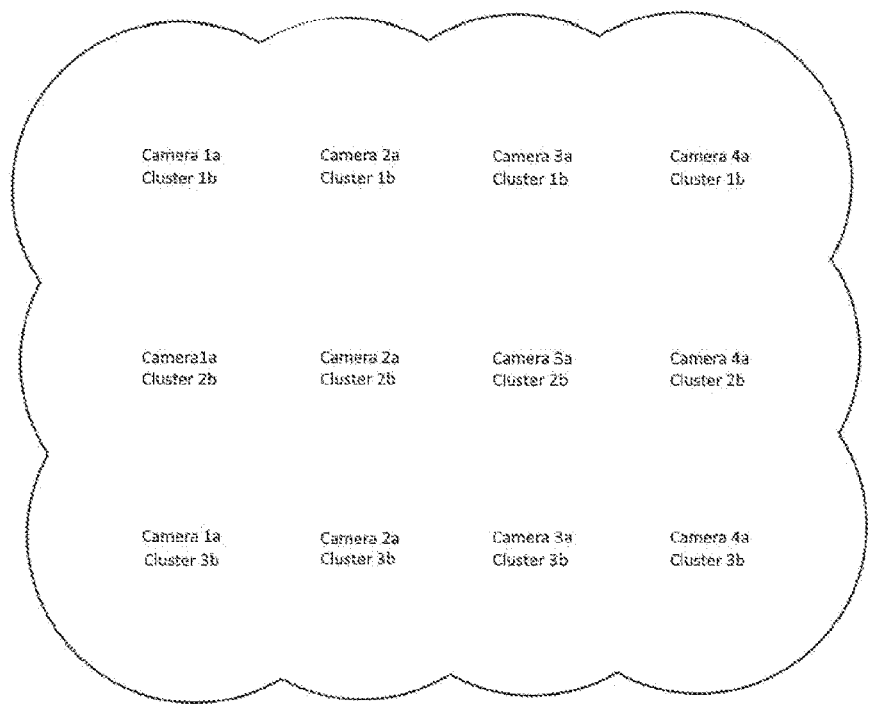
FIG. 74 is a schematic showing the relative position of the footage captures by the views of the camera array system in FIG. 72.

FIG. 74 shows the relative position of the footage captures by the views in FIG. 72.

Figure 75:
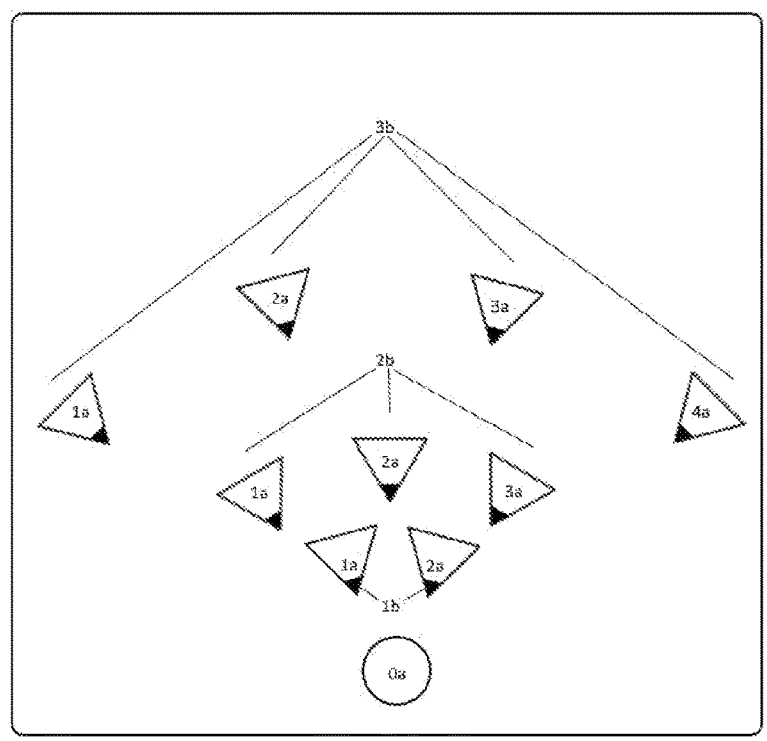
FIG. 75 is a schematic of a camera array system featuring three tiers of upward-facing cameras.

FIG. 75 is similar to FIG. 47 in terms of positioning and parallel directions, however similar to the changes between FIG. 18 and FIG. 49, the upward facing cameras are not targeting a common point in space and do not have intersecting forward directions, but instead share a common point of intersection in their backwards directions. In a preferred embodiment, each succeeding tier contains more cameras than the preceding tier. At the center may be a "zero tier" cluster (0a) of a single camera. In one variation, this single camera is directed 90 degrees from the plate.

Figure 76:
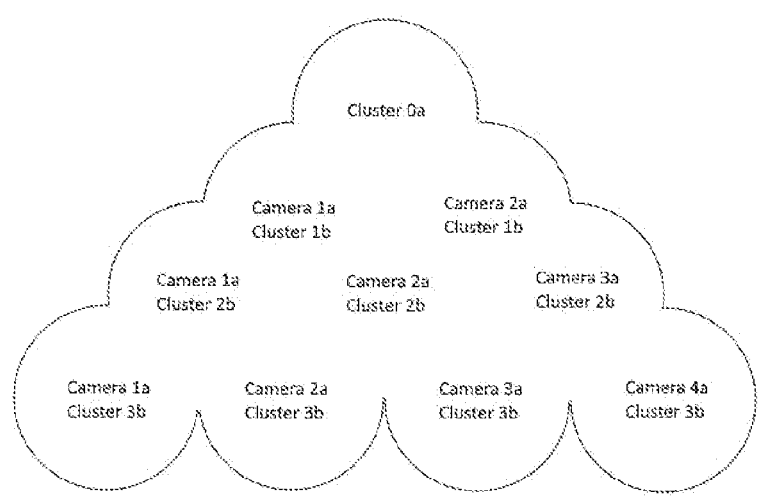
FIG. 76 is a schematic showing the relative positions of footage captured by the parallel views of the cameras in FIG. 75.

FIG. 76 is similar to FIG. 48 in terms of positioning and parallel directions, however similar to the changes between FIG. 18 and FIG. 49, the upward facing cameras are not targeting a common point in space and do not have intersecting forward directions, but instead share a common point of intersection in their backwards directions.

The invention claimed is:

1. A camera array system comprising a plurality of cameras and a plate;
   a. with the plate having a center and a periphery and configured to attach to a moving vehicle;
   b. with the plurality of cameras arranged in one or more camera clusters,
   c. with each camera cluster comprising a first camera, a second camera, a third camera a fourth camera, and a fifth camera, with the first camera having a first direction and a first field of view, the second camera having a second direction and a second field of view, the third camera having a third direction and a third field of view, the fourth camera having a fourth direction and a fourth field of view; and the fifth camera having a fifth direction and a fifth field of view;
   d. with the first direction being an optical axis of the first camera and passing orthogonally through a center of the first field of view;
   e. with the second direction being an optical axis of the second camera and passing orthogonally through a center of the second field of view;
   f. with the third direction being an optical axis of the third camera and passing orthogonally through a center of the third field of view;
   g. with the fourth direction being an optical axis of the fourth camera and passing orthogonally through a center of the fourth field of view;
   h. with the fifth direction being an optical axis of the fifth camera and passing orthogonally through a center of the fifth field of view;
   i. with the first direction, second direction, third direction, fourth direction, and fifth direction within each camera cluster having a point of intersection;
   j. with the plate being approximately parallel to a ground on which the moving vehicle is moving;
   k. with the first direction, second direction, third direction, and fourth direction each angled between approximately 30 degrees and approximately 90 degrees upward from the plate;
   l. with the fifth direction angled approximately 90 degrees upward from the plate.

2. The camera array system of claim 1, with the directions of each of the first, second, third, and fourth cameras angled between approximately 45 degrees and approximately 75 degrees upward from the plate.

3. The camera array system of claim 1, comprising a first, second, third, and fourth camera cluster;
   a. with the first direction of the first camera cluster intersecting the second direction of the second camera cluster;
   b. with the third direction of the third camera cluster intersecting the fourth direction of the fourth camera cluster.

4. The camera array system of claim 3, with the first, second, third, and fourth camera clusters being attached to and disposed on the periphery of the plate at points approximately 0, 90, 180, and 270 degrees around the center of the plate.

5. The camera array system of claim 3, additionally comprising a fifth camera cluster;
   a. with the fifth camera cluster being disposed at approximately the center of the plate and between the first, second, third, and fourth camera clusters;
   b. with the first direction of the fifth camera cluster intersecting the second direction of the second camera cluster;
   c. with the second direction of the fifth camera cluster intersecting the first direction of the first camera cluster;
   d. with the third direction of the fifth camera cluster intersecting the fourth direction of the fourth camera cluster;
   e. with the fourth direction of the fifth camera cluster intersecting the third direction of the third camera cluster.

6. A camera array system comprising a plurality of cameras and a plate;
   a. with the plate having a center and a periphery and configured to attach to a moving vehicle;
   b. with the plurality of cameras arranged in one or more camera clusters;
   c. with each camera cluster comprising a first camera a second camera, and a third camera, with the first camera having a first direction and a first field of view, the second camera having a second direction and a second field of view, and the third camera having a third direction and a third field of view;
   d. with the first direction being an optical axis of the first camera and passing orthogonally through a center of the first field of view;
   e. with the second direction being an optical axis of the second camera and passing orthogonally through a center of the second field of view;
   f. with the third direction being an optical axis of the third camera and passing orthogonally through a center of the third field of view;
   g. with the plate being approximately parallel to a ground on which the moving vehicle is moving;
   h. with the first direction and second direction each angled between approximately 30 degrees and approximately 90 degrees upward from the plate;
   with the third direction angled approximately 90 degrees upward from the plate.

7. The camera array system of claim 6, with the first and second direction each angled between approximately 45 degrees and approximately 75 degrees upward from the plate.

8. The camera array system of claim 6, additionally comprising a first and second camera cluster;
   a. with the first direction of the first camera cluster intersecting the second direction of the second camera cluster.

9. The camera array system of claim 8, additionally comprising a third camera cluster;
   a. with the third camera cluster being disposed between the first and second camera cluster;
   b. with the first direction of the first camera cluster also intersecting the second direction of the third camera cluster;
   c. with the second direction of the second camera cluster also intersecting the first direction of the third camera cluster.

10. A camera array system comprising a plurality of cameras and a plate;
   a. with the plate having a center and a periphery and configured to attach to a moving vehicle;
   b. with the plurality of cameras arranged in one or more camera clusters,
   c. with each camera cluster comprising a first camera, a second camera, a third camera, and a fourth camera, with the first camera having a first direction and a first field of view, the second camera having a second direction and a second field of view, the third camera having a third direction and a third field of view, and the fourth camera having a fourth direction and a fourth field of view;
   d. with the first direction being an optical axis of the first camera and passing orthogonally through a center of the first field of view;
   e. with the second direction being an optical axis of the second camera and passing orthogonally through a center of the second field of view;
   f. with the third direction being an optical axis of the third camera and passing orthogonally through a center of the third field of view;
   g. with the fourth direction being an optical axis of the fourth camera and passing orthogonally through a center of the fourth field of view;
   h. with the first direction, second direction, third direction, and fourth direction within each camera cluster having a point of intersection;
   i. with the plate being approximately parallel to a ground on which the moving vehicle is moving;
   j. with the first direction, second direction, and third direction each angled between approximately 30 degrees and approximately 90 degrees upward from the plate;
   k. with the fourth direction angled approximately 90 degrees upward from the plate.

11. The camera array system of claim 10, with the directions of each of the first, second, and third cameras angled between approximately 45 degrees and approximately 75 degrees upward from the plate.

12. The camera array system of claim 10, additionally comprising a first, second, and third camera cluster;
   a. with the first direction, second direction, and third direction being backwards directions and the point of intersection being between and beneath the first, second, and third cameras.

13. The camera array system of claim 12, with the first, second, and third camera clusters being attached to and disposed on the periphery of the plate at points approximately 0, 120, 240 degrees around the center of the plate.

14. The camera array system of claim 12, additionally comprising a fourth camera cluster;
   a. with the fourth camera cluster being disposed at approximately the center of the plate and between the first, second, and third camera clusters.

15. The camera array system of claim 8,
   a. with the moving vehicle moving in a forward path;
   b. with the first and second camera cluster being in a line, with the line being substantially perpendicular to the forward path.

16. The camera array system of claim 8,
   a. with the moving vehicle moving in a forward path;
   b. with the first and second camera cluster being in a line, with the line being substantially parallel to the forward path.

17. The camera array system of claim 1, comprising a first, second, third, and fourth camera cluster;
   a. with the first direction of the first camera cluster intersecting the second direction of the third camera cluster;
   b. with the third direction of the first camera cluster intersecting the fourth direction of the fourth camera cluster;
   c. with the second direction of the second camera cluster intersecting the first direction of the fourth camera cluster;
   d. with the fourth direction of the second camera cluster intersecting the third direction of the third camera cluster.

* * * * *